United States Patent [19]
Waugh

[11] Patent Number: 5,865,099
[45] Date of Patent: Feb. 2, 1999

[54] BARBEQUE GRILL AND SMOKER

[75] Inventor: John H. Waugh, Louisville, Ky.

[73] Assignee: Porcelain Metals Corporation, Louisville, Ky.

[21] Appl. No.: 694,516

[22] Filed: Aug. 9, 1996

[51] Int. Cl.[6] .............................. A47J 37/00; A47J 37/07
[52] U.S. Cl. ............................... 99/340; 99/450; 99/482; 126/9 R; 126/25 R; 126/41 R
[58] Field of Search ..................... 99/339, 340, 444–446, 99/448–450, 467, 481, 482, 352–355; 126/25 R, 25 A, 9 R, 30, 41 R; 220/379, 744

[56] References Cited

U.S. PATENT DOCUMENTS

| | | | |
|---|---|---|---|
| 3,611,915 | 10/1971 | Glaser et al. | 99/446 X |
| 3,714,937 | 2/1973 | Linstead | 126/25 R |
| 3,734,076 | 5/1973 | Kiziol | 126/25 R |
| 4,390,002 | 6/1983 | Daily, III | 220/744 X |
| 4,453,530 | 6/1984 | Schlosser | 220/379 X |
| 4,523,574 | 6/1985 | Schlosser | 126/41 R |
| 4,635,613 | 1/1987 | Tucker et al. | 126/41 R |
| 4,700,618 | 10/1987 | Cox, Jr. | 99/340 X |
| 4,962,696 | 10/1990 | Gillis | 99/482 X |
| 4,962,697 | 10/1990 | Farrar | 99/448 X |
| 5,016,607 | 5/1991 | Doolittle et al. | 126/25 R |
| 5,195,423 | 3/1993 | Beller | 99/450 X |
| 5,467,692 | 11/1995 | Perez, III | 99/340 |

*Primary Examiner*—Timothy F. Simone
*Attorney, Agent, or Firm*—Middleton & Reutlinger; David W. Carrithers

[57] ABSTRACT

A barbeque grill assembly is disclosed including a bowl and domed, free-standing lid mating with each other to form a three-dimensional oval in combination a support assembly being provided for the bowl. The grill assembly includes shelves having stops engageable with the lid providing a stop, so that the lid can move horizontally along the extended bracket surfaces and then rotate into a generally vertical position in cradled engagement with the brackets or integral shelf lid holders. The grill assembly includes vent means being suspended beneath a central portion of the bowl, an ash collector, and an ash sweep assembly to for cleanup of the ashes within the bowl. A smoker assembly for holding fuel such as charcoal or wood chips and having damper means is removably insertable between the bottom portion of the grill body and the "mug" style ash catcher to convert the grill to a smoker.

20 Claims, 20 Drawing Sheets

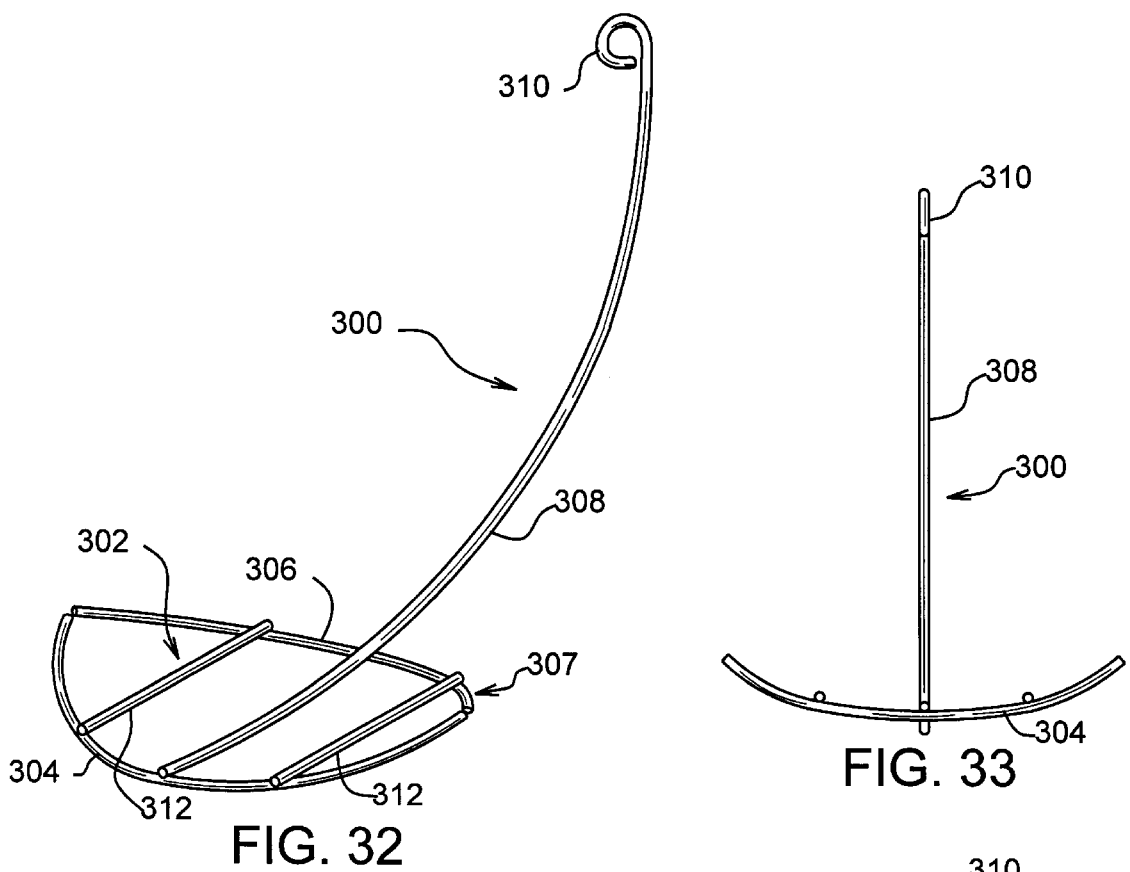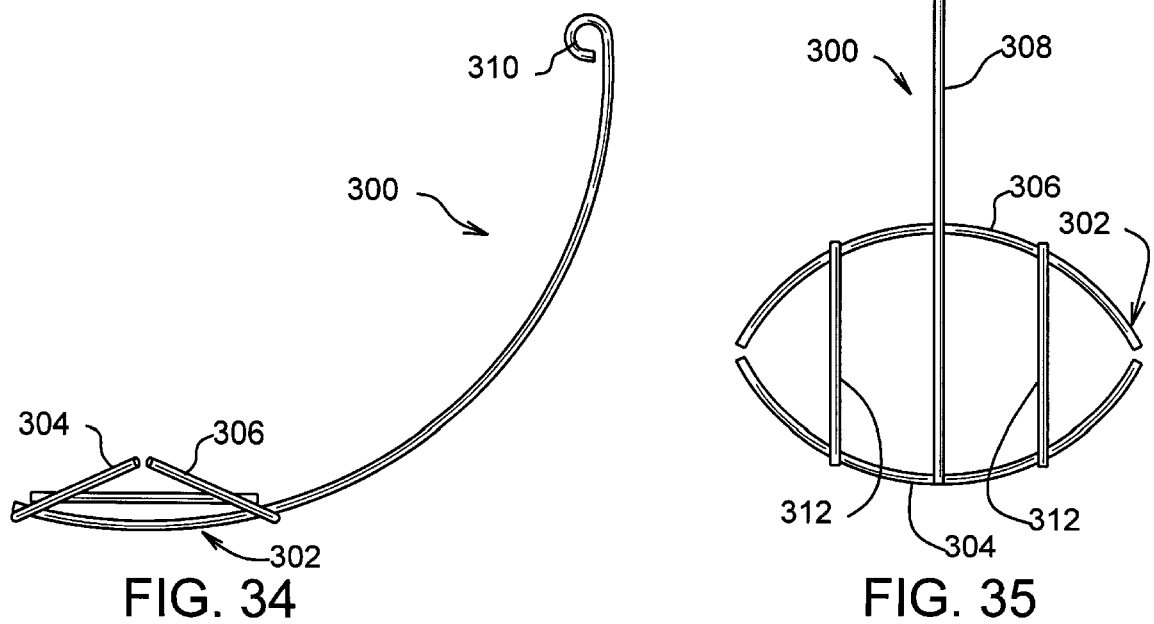

BARBEQUE GRILL AND SMOKER

FIELD OF THE INVENTION

The present invention relates to a barbeque grill assembly cooking foods and more particularly to a portable barbeque assembly adapted for use with particulate fuel such as charcoal briquettes including a smoker assembly to convert the grill into a smoker.

BACKGROUND OF THE INVENTION

A wide variety of barbeque grill assemblies have been provided in the prior art for use either with particulate fuels such as charcoal briquettes or liquid fuel.

Many of these barbeque grill assemblies are mounted wheels to make them portable and facilitate their movement from one location to another, often in outdoor areas of the home.

Such barbeque grill assemblies typically include a bowl-like base mounted on a suitable support such as a central pedestal or legs including wheels to make the unit portable as noted above. Where the barbeque unit is contemplated for use with charcoal briquettes, a cooking grill is normally mounted in the bowl above a fuel grill for receiving the briquettes.

The barbeque units commonly have an enclosure formed between the bowl and a dome-shaped lid with vents regulating the flow of air or oxygen through the interior to adjust the rate of burning of the briquettes. Operation is further enhanced by providing a accessories such as shelves for receiving food containers or cooking utensils. In addition, much of the prior art is directed toward arrangements for facilitating movement of the lid by a user in order to maintain the lid in open position upon the bowl and allow the user to add food to the cooking grill, rotate food articles already on the grill, replace or add charcoal briquettes or the like.

Representative barbeque grill assemblies of the type referred to above have been disclosed for example U.S. Pat. No. 3,611,915 issued Oct. 12, 1971 to Glaser; U.S. Pat. No. 3,689,758 issued Sep. 5, 1972 to Stephen, Jr.; U.S. Pat. No. 3,714,937 issued Feb. 6, 1973 to Lindstead; U.S. Pat. No. 3,734,076 issued May 22, 1973 to Kiziol; U.S. Pat. No. 4,390,002 issued Jun. 29, 1983 to Daily, III; U.S. Pat. No. 4,453,530 issued Jun. 12, 1994 to Schlosser; and U.S. Pat. No. 4,523,574 issued Jun. 18, 1985 also to Schlosser; U.S. Pat. No. 4,635,613 issue Jan. 13, 1987 to Tucker, et al. discloses a barbeque grill with a lid support means comprising clips mounted to a support structure away from the grill. However, it appears necessary for a user to first lift the lid and then insert it into a supported position on the clips.

The examples noted above are merely representative of barbeque assemblies available in the prior art and generally corresponding to the above described features.

The variety of barbeque grill assemblies available in the prior art is indicative of the widespread use and popularity of such units particularly for home or family use. However, there has been found to remain a need for further improvements in the units, particularly for facilitating their use under a wide variety of conditions and to allow the user to employ individual skills or techniques in the preparation of various foods.

Furthermore, a conversion means to convert a grill to a smoker in a quick, easy, and inexpensive manner provides the user with an option as to how to prepare food using a single grill assembly saving space and cost of a separate grill and smoker unit.

SUMMARY OF THE INVENTION

It is therefore in object of the invention to provide an improved barbeque grill assembly capable of further enhancing cooking techniques of various individuals by constructing the barbeque grill assembly to facilitate its use while allowing the user to properly regulate cooking conditions within the unit.

It is a more specific object of the invention to provide such a barbeque assembly including a bowl and domed, free standing lid mating with each other and having a curved configuration at their intersection and cradle means for allowing a user to open the lid in a normal manner, the cradle means including either a pair of integral shelf lid holders attachable to the assembly on either side of the grill, or two brackets having extended surfaces facing each other and spaced apart less than a corresponding dimension of the lid with stop means formed on end portions of the extended surfaces whereby lifting of the lid causes the lid to move horizontally along the extended bracket surfaces and then rotate into a generally vertical position upon engagement with the stop means with the lid being cradled by the extended bracket surfaces and stop means in combination. The brackets are mounted upon a portion of the barbeque grill assembly, either attached directly to the bowl or to a portion of the support assembly for the bowl.

Preferably, the bowl and lid have a three-dimensional oval configuration with elliptical openings at their mating intersection, the three-dimensional configuration of the bowl and lid in combination corresponding to rotation of the ellipse about its longitudinal axis. As will be described in greater detail below the three-dimensional configuration of the bowl and lid combination is believed to be aesthetically pleasing while also being utilitarian, particularly when the unit is adapted for use with particulate fuels such as briquettes in that briquettes can be arranged more uniformly beneath substantially the entire cooking area of the cooking surface. In addition. the cooking surface of the cooling grill is enlarged laterally, allowing for cooking of larger or more irregular food shapes.

The barbeque grill assembly is more preferably of a type including a support structure including a shelf forming an opening for receiving the bowl as a drop-in unit as further set forth in U.S. Pat. No. 5,016,607 by Doolittle et al. hereby incorporated by reference.

The barbeque assembly also preferably includes a cooking grill and fuel grill adapted to be supported in a spaced apart relation within the bowl. Preferably, the bowl and lid as well as the cooking grill and fuel grill are elliptically shaped. The cooking grill is more preferably formed with a hinged center portion which may be raised, for example, to adjust or add fuel on the fuel grill or after cooking to sweep the ashes into the ash collector.

In the bottom of the grill bowl is a centrally disposed hole. A short cylindrical bowl sleeve extends downwardly therefrom formed with a plurality of bowl sleeve air flow vent perforations. A bowl vent assembly is formed by a bowl collar rotatably mounted around the bowl sleeve including similar bowl collar vent perforations. The bowl collar may be moved or rotated in order to adjust surface area of the opening between the bowl collar vent perforations and the bowl vent perforations or to move the bowl vent perforation and bowl collar vent perforations out of register with each other to entirely close the air flow to the grill to smoother the flames. A means of attachment extends from the bottom of the bowl vent for cooperative engagement with an ash catcher, or smoker assembly.

The grill can be converted to a smoker. The smoker assembly is substantially "mug" shaped. The smoker assembly includes a vertically extending tubular or cylindrical main body portion formed having an open top and bottom with smoker vent perforations at selected positions near the bottom of the main body. A collar is movably mounted on the cylindrical body portion and includes similar vent perforations. The collar may be moved or rotated in order to adjust the opening of the smoker vent assembly or to move the perforation out of register with each other to entirely close the vent assembly. A tab can be used to laterally adjust the collar by rotation with respect to the tubular main body portion of the smoker body for opening and closing the vent assembly. The bottom of the smoker body includes a hole and the side walls are curved inwardly forming a flange. A wire grate having openings is supported upon the flange to support fuel such as wood chunks, wood chips, or charcoal. The top of the smoker body includes at least one attachment means such as one of more flanges designed for cooperative slidable engagement with at least one attachment means such as the flanges of the bowl vent assembly. The bottom of the smoker body includes attachment means designed for cooperative slidable engagement with attachment means extending from the top of the ash collector. A handle extends from one side of the smoker body. An ash collector is mounted beneath the vertically extending tubular main body portion of the smoker. The ash collector also has a handle.

Conversion of the grill to a smoker is fast and easy. Simply slide off the ash collector. Place fuel such as wood chunks, wood chips, or charcoal in the smoker assembly and slide the smoker assembly into place in cooperative engagement with the bowl. Moreover, aromatic flavoring herbs or woods may be placed directly on or near the smoker assembly to produce a smoke having particular flavor characteristics. The ash collector may be slidably connected the lower portion of the smoker assembly. A wood or charcoal fire is built inside the smoker assembly and the damper on the smoker assembly, bowl, and/or top vent is adjusted to draw the heat and smoke from the smoker assembly through the grill cooking chamber. The food to be smoked is placed on the top grill inside the grill bowl so that the food adsorbs the indirect heat and smoke from the smoker assembly. The cooking temperature can be adjusted up or down by adjusting the air vent and the bowl and/or smoker assembly dampers to increase or reduce the air flow through the smoker assembly. A moist cooking environment may be produced by placing a water pan inside the grill on the lower shelf, (the charcoal holding shelf when grilling), whereby the heated air vaporized the water and provides a means of increasing the humidity or moisture in the air and the dryness of the food article to be smoked therein. A flavored marinade may be utilized with the water to produce a organoleptic and flavor enhancing steam vapor as the liquid heats. The marinade vapor combines with the smoke to moisten and flavor the food. Thus, the aromatic smoke and steam vapors baste the food while the indirect heat slowly cooks the food. Furthermore, the pan used in the present invention is an inexpensive aluminum foil pan which may be used several times until it becomes stained and soiled, then it can be discarded as recyclable aluminum material.

It is an object of the present invention to provide a barbeque grill assembly of the type generally referred to above, preferably with a support structure for the bowl which permits access below a central portion of the bowl for an ash sweep and ash collector. Preferably the grill includes a vertically arranged tubular element or bowl vent assembly including adjustable venting means and self-cleaning attachment means beneath the tubular element for releasably securing an ash collector in place thereunder.

It is another object of the present invention to provide a smoker assembly which is interchangeable with the ash catcher assembly.

It is another object of the present invention to provide a smoker assembly with a means for regulating the air flow and temperature produced in the smoking process by use of a damper within the smoker assembly.

It is another object of the present invention to provide a means of quickly converting the grill to a smoker using a detachable smoker assembly in combination with the ash catcher assembly.

The ash sweep assembly is adapted to fit below the fuel rack and above the ash collector and includes a steel wire or rod rack formed having a pair of inwardly curving rods forming a elliptical central sweeping section having connecting rods thereinbetween and a central rod extending perpendicular with respect to the central sweeping section forming a handle. The entire ash sweeping assembly is dished to be complementary shaped to the curved surface of the elliptically shaped grill.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 32 is a perspective view of the ash sweep;

FIG. 33 is a front plan view of the ash sweep;

FIG. 34 is a side elevational view of the ash sweep;

FIG. 35 is a top plan view of the ash sweep;

SPECIFICATION

Figure 1:
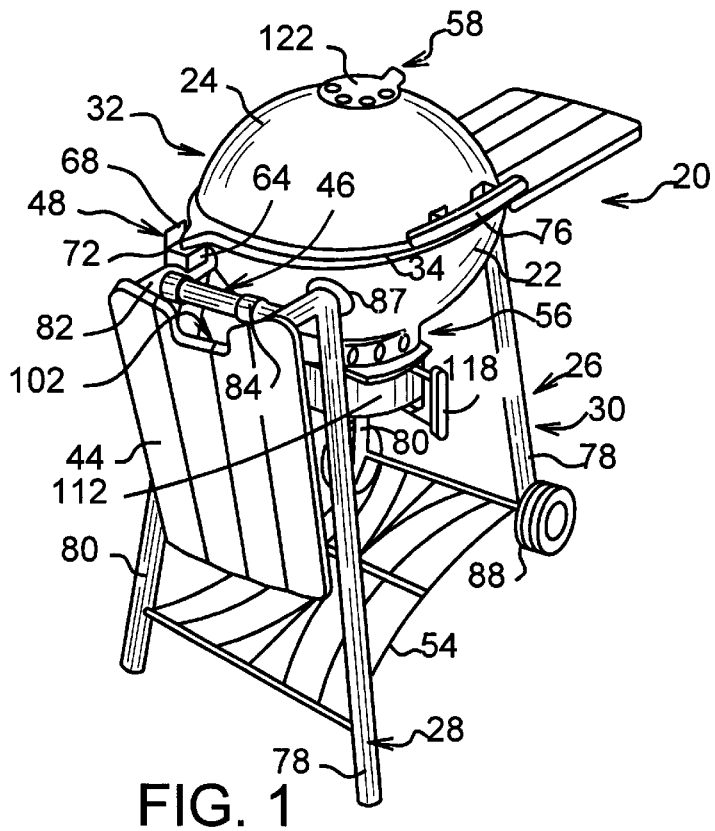
FIG. 1 is a pictorial representation of a barbeque grill assembly constructed according to the present invention with a bowl and domed, free-standing lid forming a three-dimensional oval configuration, a movable shelf on the other leg assembly is illustrated in a vertical suspended position.

The portable grill of the present invention is manufactured from readily available materials and simple in design. The preferred embodiment is comprised of metal, more particularly components formed from steel and porcelain coated steel; however, it is contemplated that copper, aluminum, stainless steel, or other metal alloys can be used with or without porcelain coating and in combination with or substituted for the porcelain coated metal components of the present invention.

Referring now to the drawings, a barbeque grill assembly constructed according to the present invention is generally indicated at 20 and includes a bowl-like member 22 and mating, domed free-standing lid 24.

The bowl 22 and lid 24 intersect at 32 with the lid 24 having a slightly larger flanged edge 34 to fit over a mating flanged edge 36 on the bowl 22. The flanged edge 34 of the lid 24 is illustrated in FIGS. 1 and 2 with the flanged edge 36 of the bowl 24 being illustrated best in FIG. 3.

Figure 2:
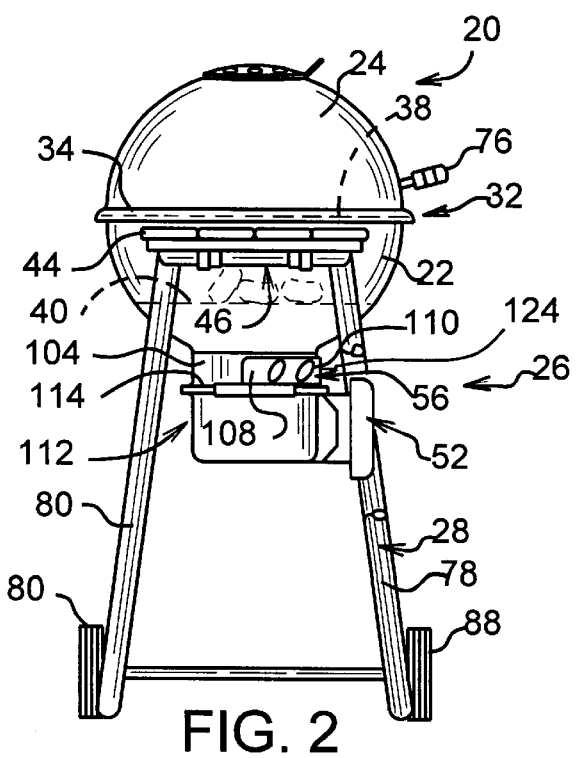
FIG. 2 is a side view of the barbeque grill assembly of FIG. 1, in order to better illustrate the three-dimensional configuration of the bowl and lid in combination.
Figure 3:
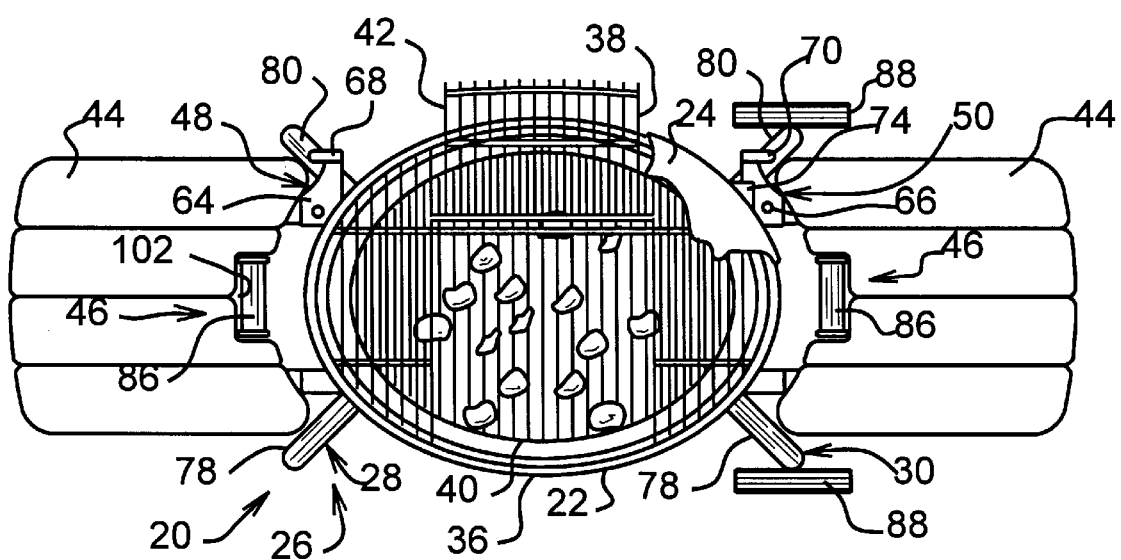
FIG. 3 is a top view of the barbeque grill assembly generally illustrating the elliptically configured opening for both the bowl and lid at their intersection.

FIG. 3 shows the intersecting opening or openings 32 for the bowl 22 and lid 24 are curved and preferably have an elliptical configuration both to enhance appearance of the barbeque grill assembly and also to facilitate cooking of food in the grill assembly 20. Referring particularly to FIGS. 1 and 2, the bowl 22 and lid 24 have a three-dimensional shape combination corresponding to rotation of the elliptical opening 32 about its longitudinal axis.

Figure 14:
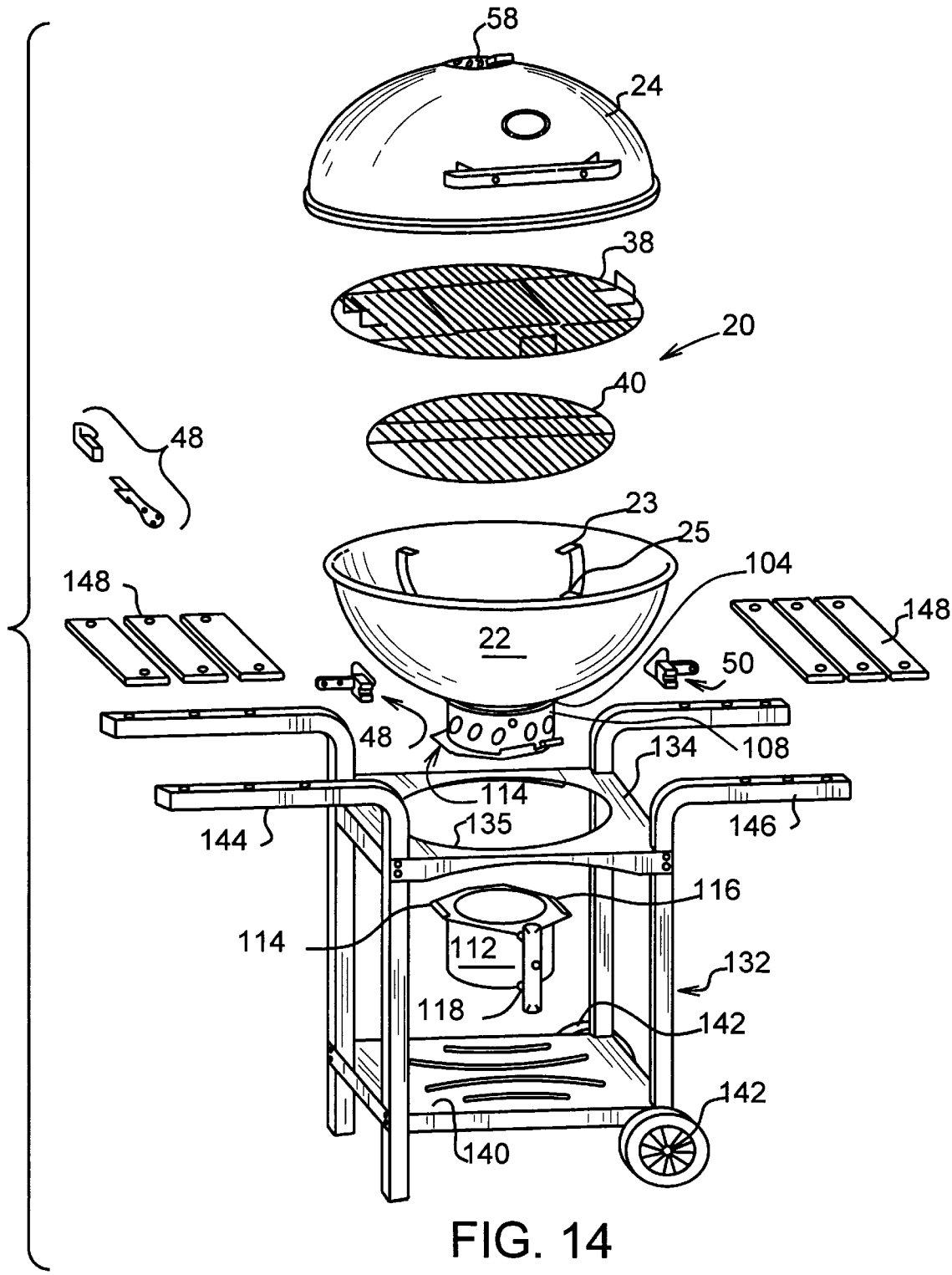
FIG. 14 is an exploded view in perspective of the barbeque grill assembly depicted in FIG. 13.

Referring in combination to FIGS. 2, 3, and 14 a food grill 38 is arranged in the bowl 22 on brackets 23 above a lower grill 40 supported by brackets 25 for receiving particular fuels such as charcoal briquettes.

As may be seen in both FIGS. 2 and 3, the elliptical three-dimensional configuration of the bowl 22 permits the fuel grill 40 to extend almost entirely beneath the upper food grill 38, particularly a central cooking area most often used in such barbeque grill assemblies. The upper food grill 38 is also formed with a hinged portion 42 in the central cooking portion of the grill. Accordingly, a user may move food products away from the hinged grill portion 42 and then raise that portion of the grill in order to adjust charcoal briquettes or add additional briquettes as necessary without substantially disturbing the cooking food on the upper grill 38.

A lid vent 58 is arranged on a central portion of the lid 24. Both the lid vent 58 and the bowl vent and ash collector assembly 56 are adjustable in order to regulate the amount of air or oxygen passing through the interior of the bowl 22 and lid 24 in order to control burning of briquettes therein.

The leg assemblies 28 and 30 are each formed as relatively unitary structures from tubular metal and serve a combined function of supporting the bowl 22, mounting a movable shelf 44 as supporting the bowl 22, mounting a movable shelf 44 as well as a handle 46. The movable shelf 44 and handle 46 can be arranged on only one of the leg assemblies if desired. The two leg assemblies 28 and 30 additionally mount cradle brackets 48 and 50 which support the lid 24 on the bowl 22 when the lid 24 is opened by the user. With the leg assemblies 28 and 30 arranged at opposite ends of the bowl 22, a bowl vent assembly 56 and ash collector 112 is suspended from a central portion of the bowl 22 for regulating the air flow and receiving ashes from consumed briquettes or other fuel in the bowl 22.

The construction of the leg assemblies 28 and 30 is even more preferably selected for facilitating mounting of the leg assemblies on curved surfaces of the bowl 22. An additional structural members for linking the legs assemblies 28 and 30 together, such as a wire shelf 54, is interconnected with the lower ends of the leg assemblies 28 and 30 remote from the bowl 22 in order to further enhance structural rigidity of the leg assemblies in combination with the bowl 22. Without the wire shelf 54, weight on an oval or elliptical bowl could cause the leg assemblies 28 to shift or spread, resulting distortion of the bowl 22. This is prevented by the wire shelf which acts in tension to prevent spreading of the leg assemblies or distortion of the bowl 22.

Figure 8:
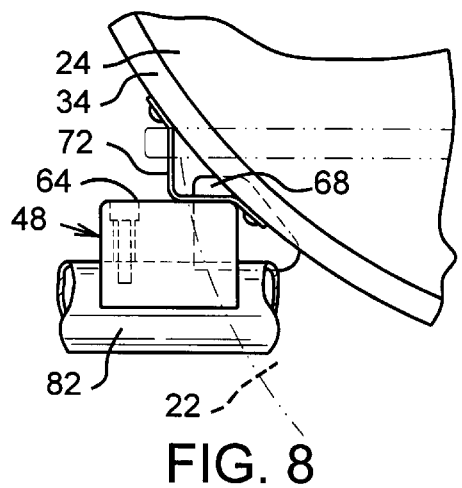
FIG. 8 is a view taken along section line VIII—VIII of FIG. 7 to better illustrate a rounded or beveled extended surface on the bracket and positioning of guide.
Figure 7:
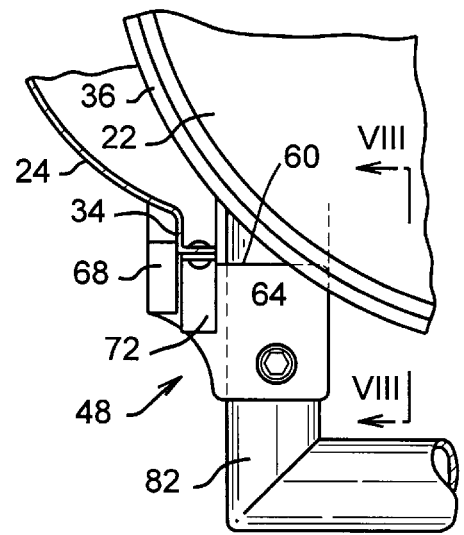
FIG. 7 is a view taken along section lines VII—VII in FIG. 5 to provide a detailed top view of the bracket.

Moreover, the cradle brackets 48 and 50 are positioned in fixed relation to the bowl 22 and lid 24, preferably be being mounted on a portion of the barbeque grill assembly. In the embodiments illustrated in FIGS. 1–12, the cradle brackets 48 and 50 are mounted on or attached to a portion of the support structure 26 for the bowl 22. As described in greater detail herein, the brackets 48 and 50 are mounted on the leg assemblies. However, referring particularly to the embodiment of FIG. 13, the brackets 48 and 50 could for example be mounted on the shelf 134 for supporting the bowl 22. For instance, in the embodiments of FIGS. 15–18, one of the brackets indicated at 48 is attached directly to the bowl 22. The cradle brackets 48 and 50 are positioned upon the respective leg assemblies 28 and 30 so that the extended surfaces 60 are fixed apart from each other by a distance somewhat less than a corresponding dimension of the bowl and lid as may be best seen in FIG. 3. The surfaces 60 and 62 are preferably rounded or beveled as illustrated in FIG. 8 while being arranged slightly beneath the flanged edge 34 of the lid when the lid 24 is normally positioned upon the bowl 22 as illustrated in FIGS. 1 and 2.

Each of the cradle brackets 48 and 50 is also formed with a top surface 64 or 66 for engaging guide projections on the lid 24 as described in greater detail below. Projecting stops 68 and 70 are arranged or formed on the extended ends of the cradle brackets 48 and 50 to further facilitate cradling of the lid 24 on the brackets.

The guide projections 72, 74 referred to above are mounted on the flanged edge 34 of the lid 24 for engaging the upper or top surfaces 64 and 66 respectively of the cradle brackets 48 and 50 in order to better assure that the lid 24 remains in proper alignment with cradle brackets 48 and 50. However, the guide projections 72 and 74 could also be integrally formed by the flanged edge 34.

Figure 4:
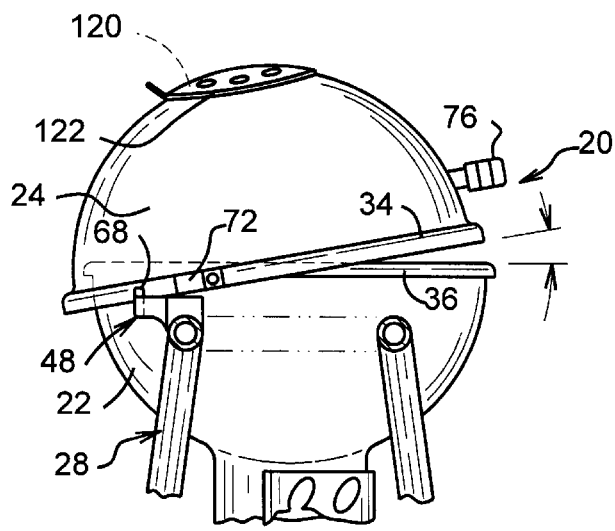
FIG. 4 is a partial side view of the barbeque grill assembly with the lid partially open to illustrate its initial engagement with the cradling brackets.

The cradle brackets 48 and 50 are also arrange don a side portion or back of the bowl 22 opposite a handle 76 on the lid 24. in operation, when a user wishes to open the barbeque grill assembly, he normally grasps the handle 76 and raises it toward an initial position illustrated in FIG. 4 with the lid flange 34 and guide projections 72 and 74 respectively engaging the extended surfaces 58, 60 and the upper surfaces 64, 66 on the cradle brackets 48 and 50.

Figure 5:
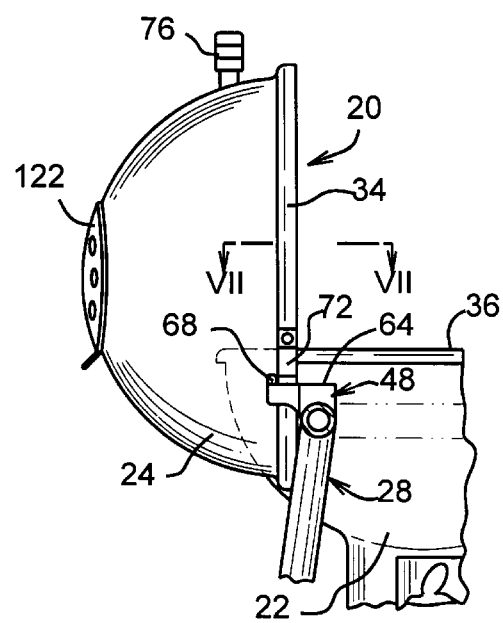
FIG. 5 is a view similar to FIG. 4 but with the lid fully open and cradled on the brackets.
Figure 6:
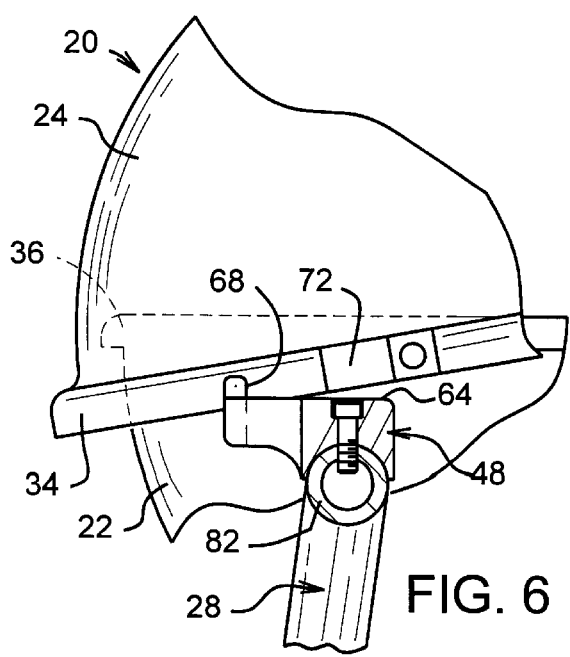
FIG. 6 is an enlarged fragmentary view, similar to FIG. 2, illustrating one of the brackets with the lid partially open as in FIG. 4.

As the user continues to raise the lid from the position illustrated in FIG. 4 toward the open position in FIG. 5 the flanged edge 34 on the lid 24 tends to slide along the extended surfaces 60 and 62 of the cradle brackets until it engages the projecting stops 68 and 70. The lid 24 is then positioned generally vertically with the entire interior of the bowl 22 being exposed as illustrated in FIG. 5. At the same time, the extended edge 34 of the lid 24 is cradled between the extended surfaces 60, 62 and the projecting stops 68 and 70 on the cradle brackets 48 and 50. A portion of the lid flange 34, opposite the handle 76, rests against the bowl 22 when the lid 24 is in its open or vertical position.

During movement of the lid 24 from the closed position of FIG. 2 through the partially open position of FIG. 4 and into the fully opened position in FIG. 5, the guide projections 72 and 74 remain engaged with the upper surfaces 64 and 66 of the cradle brackets 48 and 50 so that the lid remains in properly cradled orientation with the brackets 48 and 50.

The cradle brackets 48 and 50 are preferably formed or cast, for example, from a suitable heat resistant material such as a plastic or the like. The bracket material is sufficiently resilient to avoid scratching or marking the metal surface of the lid 24. As may be seen in FIGS. 4–6, each of the cradle brackets 48 and 50 is formed with an arcuate depression for receiving a respective tubular portion of the leg assembly 28 or 30 upon which it is positioned.

At least one and preferably both of the leg assemblies 28 and 30 additionally provide support mounting for a movable shelf 44 and handle 46. Since the two leg assemblies 28 and 30 are of generally similar but mirror image constructions, only the leg assembly 28 is describe below with the other leg assembly 30 including similar components.

Figure 9:
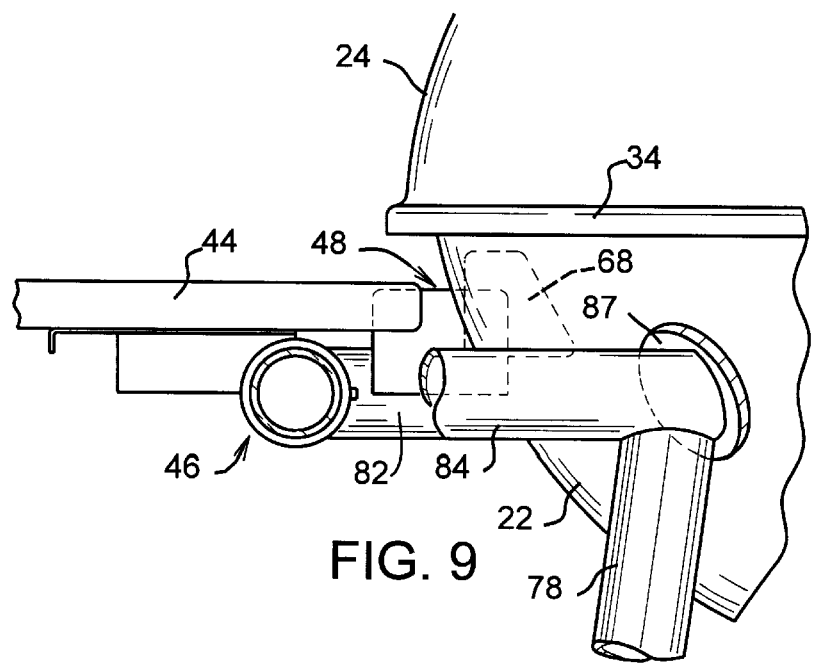
FIG. 9 is a fragmentary view of one leg assembly with the corresponding shelf being in its erect position.
Figure 10:
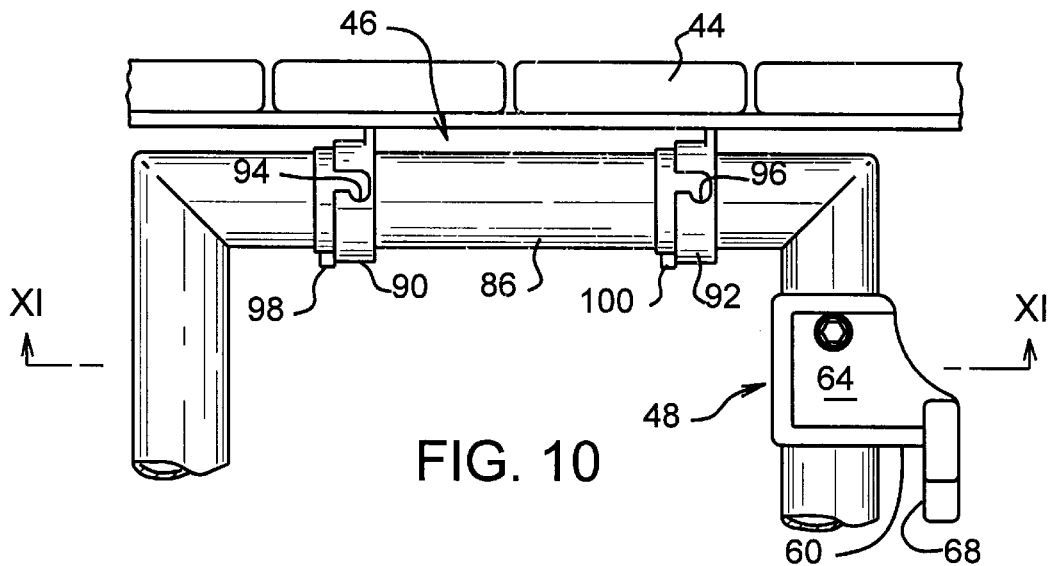
FIG. 10 is a top view corresponding to FIG. 9 while illustrating the handle, shelf and bracket being mounted on one leg assembly with the shelf in its vertical suspended position.
Figure 11:
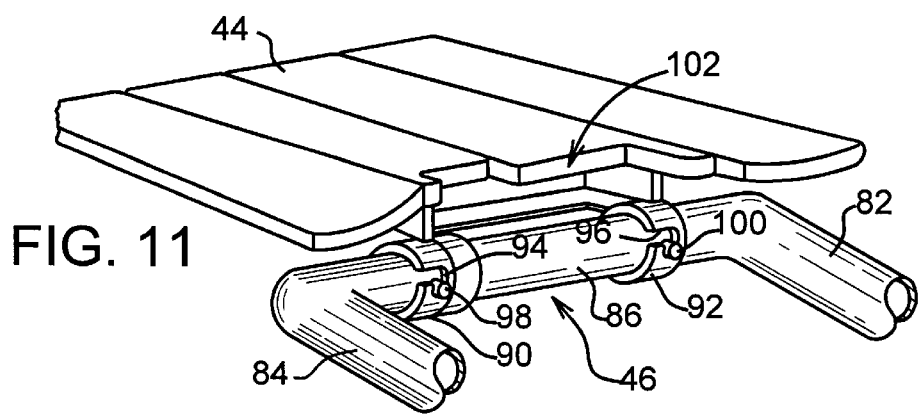
FIG. 11 is a pictorial fragmentary view of the leg assembly of FIGS. 9 and 10 wile illustrating slot and pin combinations for movably positioning the shelf.
Figure 12:
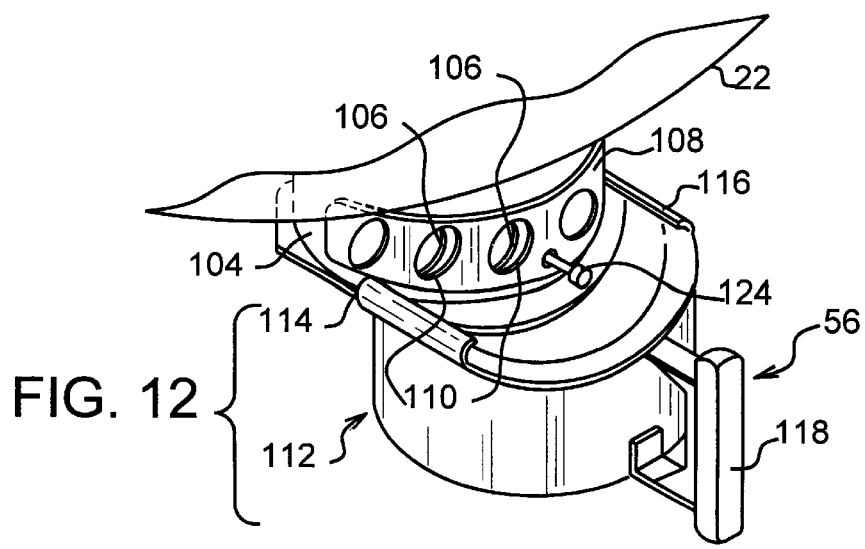
FIG. 12 is an enlarged fragmentary view of the bowl vent assembly with its vent collar rotated to a partially open position and the ash collector in a partially open position.

Referring particularly to FIGS. 9–11, the leg assembly 28 is formed from structural tubing to include front and back legs 78 and 80 respectively. In addition, tubular portions 82 and 84 of the leg assembly are arranged in coaxial relation to each other, adjacent the end of the bowl 22, for receiving a cylindrical handle 86 therebetween. Preferably, the handle 86 is formed from a material such as wood with poor heat transfer characteristics in order to permit moving of the barbeque grill assembly 20 during use.

The leg assemblies are secured to the bowl 22 by saddles 87 which are shaped to generally conform to the curves surface of the bowl 22. The saddles are preferably welded to both the bowl 22 and leg assembly 28 or 30.

The leg assemblies 28 and 30 differ substantially only in the wheels 88 mounted beneath the legs 78 and 80 of the leg assembly 30.

The movable shelf 44 is formed from wood or heat resistant plastic and includes mounting brackets 90 and 92 which are rotatable and axially movable upon the tubular portions 82 and 84 of the leg assemblies. Referring particularly to FIG. 11, the rotary brackets 90 ad 92 are formed with curved slots 94 and 96 for receiving projecting pins 98 and 100 on the tubular portions 82 and 84 of the leg assembly. The movable shelf or tray 44 is also formed with a cutout 102 between the mounting brackets 90 92 and adjacent the handle 76.

With this arrangement, the cutout 102 in the tray leaves the handle 76 exposed with the shelf or tray 44 either in its erect position illustrated in FIG. 1 or its either in its erect position illustrated in Figure or its suspended position. At the same time, particularly with the shelf 44 in its suspended position as illustrated in FIG. 11, the slot and pin combinations 94, 98, 96, 100 are exposed to a user to clearly indicate how the shelf 44 can be moved to an erect position.

In that regard, it is only necessary to rotate the shelf so that the pins 98 and 100 are in lateral portions of the slots 94 and 96. The shelf may then be moved laterally for aligning the pins 98 and 100 with either the short vertical portions at one end of the respective slots or at the other end of the slots. With the pins in the short portions of the slots, the shelf 44 is maintained in its erect position illustrate in FIG. 1. With the pins 98 and 100 at the other ends of the slots, the shelf 44 is permitted to rotate downwardly to its suspended position illustrated in FIG. 11.

In the preferred embodiment, the bowl 22 is formed having a centrally disposed aperture surrounded by an integrally formed short cylindrical bowl sleeve 104 extending downwardly therefrom formed with a plurality of bowl sleeve air flow vent perforations 106. Preferably, the bowl vent perforations 106 are inclined ellipses conforming to the overall configuration of the bowl 22 and lid 24 in combination. A bowl vent assembly 104 is formed by a bowl collar 108 rotatably mounted around the bowl sleeve 104 including similar bowl collar vent perforations 110. Thus the bowl collar 108 may be moved or rotated in order to adjust surface area of the opening between the bowl collar vent perforations 106 and the bowl vent perforations 110, or to move the bowl vent perforation 106 and bowl collar vent perforations 110 out of register with each other to entirely close the air flow to the grill to smoother the flames. A tab 124 extending outwardly from the exterior surface of the bowl collar 108 can be used to laterally adjust or rotate the bowl collar 108 with respect to the bowl sleeve 104 for opening and closing the bowl vent assembly 56. A mounting flange assembly 114 having a centrally disposed hole therethrough size and shaped in accordance with the diameter of the bowl sleeve 104 forms a lip for cooperative slidable engagement with a pair of flanges 116 extending from the ash collector 112. The flange assembly usually includes a pair of horizontal mounting flanges 114 affixed perpendicularly to the interior or exterior surface of the bowl sleeve 104 such as by rivets or welding forming lips for cooperative sliding engagement with the self cleaning flange(s) 116 of the ash collector 112. The flange(s) 114 and 116 may be mounted to the bowl sleeve 104 or ash collector 112 by holding means defining brackets.

The ash collector 112 is mounted beneath the vertically extending bowl sleeve 104 by slidably mating the self-cleaning curved top flanges 116 of the ash collector 112 with the bottom flange lips 114 of the vertically extending bowl sleeve 104. The ash collector 112 also has a handle 118 to facilitate retraction of the ash collector 112 from the bowl sleeve 104 in order to empty ashes therefrom.

Figure 42:
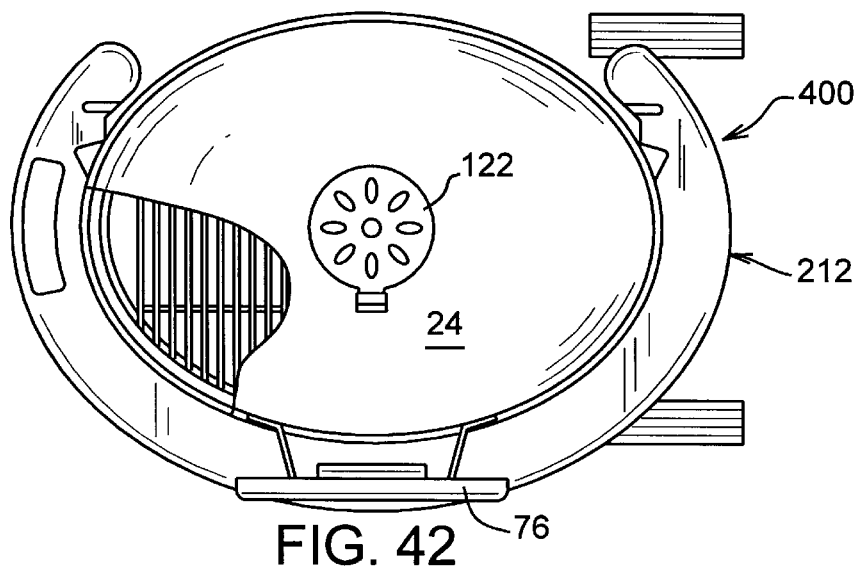
FIG. 42 is a top cutaway view showing the grill.

It is contemplated that an ash collector 112 could include an extended main body portion as shown in FIG. 42, forming a bowl vent assembly 56 in cooperative engagement with bowl sleeve 104, wherein the top most portion of the extended main body of the ash collector 112 is formed with bowl vent perforations 106. A collar 108 may be movably mounted around the top portion of the ash collector 112 and include collar vent perforations 110. Thus the collar 108 can be moved or rotated in order to adjust the opening of the bowl vent assembly 56 or to move the bowl vent perforations 106 and collar vent perforations 110 out of register with each other to entirely close the bowl vent assembly 56.

This combination of the vented bowl assembly 56 of the preferred embodiment is particularly advantageous in that the vent assembly is formed on a vertical surface of the tubular extension or bowl sleeve 104 substantially above the bottom of the ash collector 112. Thus, the design of the vented bowl assembly 56 assures that the bowl vents 106 are not plugged and made inoperable by ashes collecting from the bowl 22.

The present invention also includes an ash sweep assembly 300 as shown best in FIGS. 31–35, adapted to fit below the fuel grill 40 and above the ash collector 112. The preferred embodiment is comprised of chromed steel for durability and aesthetic appeal; however it is contemplated that any metal could be used as a material of construction. The ash sweep 300 includes a steel wire or rod rack main body portion 302 formed having a pair of inwardly curving sweeping rods, a first outer sweeping rod 304 and a second inner sweeping rod 306 forming a generally elliptical central sweeping section 307. As shown, the preferred embodiment includes a long central connecting rod 308 extending perpendicular with respect to the sweeping rods 304, 306 having a distal end connected to the center of the outer sweeping rod 304 and extending outwardly pass the inner sweeping rod 306. The distal end of the central connecting rod 308 is looped forming a handle 310 for easy manipulation of the ash sweep 300 by the user. In the preferred embodiment, a pair of perpendicular connecting rods 312 join the sweep rods 304 and 306 providing structural strength, balance, and a means for breaking up ash deposits along the bottom of the bowl 22. The entire ash sweep 300 is dished shaped in that it is complementary sized and shaped with respect to the curved surface of the bottom of the elliptically shaped grill bowl 22.

When not in use the ash sweep 300, the sweeping section 307 rests on the underside of the charcoal or fuel grill 40. The ash sweep 300 is not required to remove ashes during the use of the present grill 20, such as described in conventional grills known in the art, for the venting system of the present grill 20 is arranged on the sides of the ash collector assembly 112 so as not to clog the vents 106, 110. The purpose of the ash sweep is to provide a convenient means of cleaning the grill bowl 22 after use. To use the ash sweep 300, the user merely pulls upward on the ring handle 310 upward between the edge of the fuel grill 40 and food grill 38 and the edge of the bowl 22. The ash sweeping section 307 and ashes are pulled across the ash collector 112 until the ash sweep section 307 is in contact with the fuel grill support bracket 25. The ash sweep 300 is then pushed back over the ash collector 112 until the sweeping section touches the fuel grill support bracket 25 on the opposite side of the grill bowl 22 and the handle 310 rests at the edge of the food grill 38 and the bowl 22. The procedure may be repeated as needed; however, usually one cycle will suffice. When not in use the ash sweep 300 rests in the bottom of the grill bowl 22 with the handle ring 310 nested between the food grill 38 and the bowl 22 so that the lid 24 may be closed without touching the handle 310. Only the central rod 308 covers any portion of the ash collector 112 during the cooking session, so as not to obstruct the flow of air upward from the vents 106, 110.

The other vent assembly 58, arranged above the lid 24, is similarly adjustable for regulating air flow through the barbeque grill assembly. Because of the elliptical configuration of the lid, vent openings in the lid 24 itself are formed on a hemispherical portion 120 on the lid 24. The vent assembly includes a similar hemispherically formed movable vent member 122, the lid portion 120 and the movable vent member 122 forming respective perforations similar to those described for the vent assembly 56 and operable in a similar manner to regulate air flow through the barbeque grill assembly.

Figure 13:
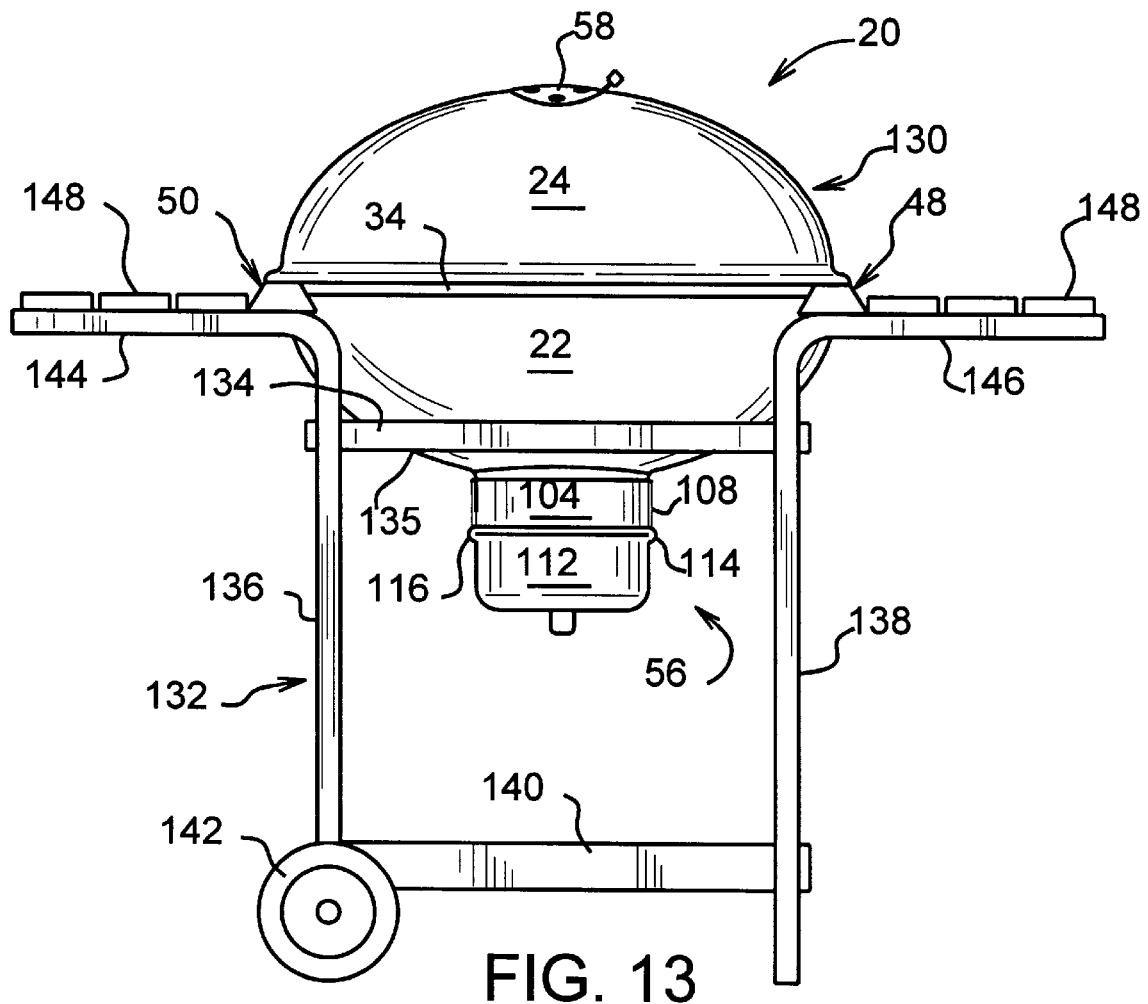
FIG. 13 is a front view of a barbeque grill assembly similar to that of FIGS. 1–12 but including a different support structure.

Another embodiment of a barbeque grill assembly constructed according to the invention is indicated at 130 in FIG. 13 and includes a substantially similar bowl, and other components as in FIGS. 1–12. The similar components are indicated by primed numerals corresponding to the numerals for the components in FIGS. 1–12.

The grill assembly 130 has a different support structure 132 also fabricated from tubular metal and having a central tray 134 suspended between unitary leg assemblies 136 and 138. The shelf 134 is cut out to form an opening 135 for receiving the bowl 22 as a drop-in unit. The support structure also has a lower structural shelf 140 and wheels, one being indicated at 142.

Laterally extending portions 144 and 146 on the support structure provide fixed mountings for shelves 48 at either end of the bowl 22 similarly as the shelves 44 of FIGS. 1–12.

The support structure 132 also provides open access below a central portion of the bowl 22 for suspending the ash collector 112 similarly as in FIGS. 1–12.

The exploded view of FIG. 14 better illustrates features of construction of the various components of the grill assembly 130 of FIG. 13 while also better illustrating the interrelation of those components. For example, it may be clearly seen how the bowl 22 nests in the opening 135 of the shelf 134.

Figure 15:
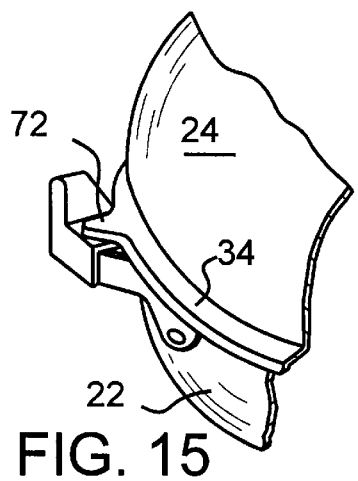
FIG. 15 is a fragmentary perspective view illustrating portions of the bowl and lid in another embodiment of the invention wherein the cradling brackets are mounted directly upon the bowl.
Figure 16:
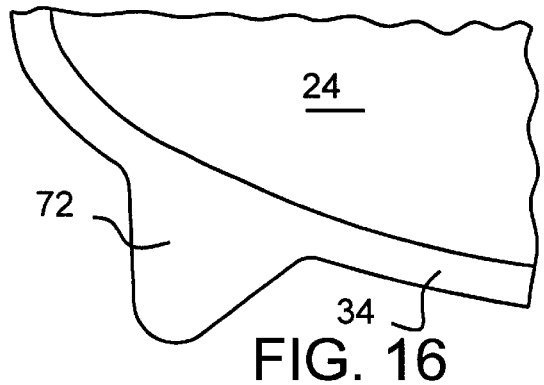
FIG. 16 is a fragmentary plan view of the lid alone illustrating one of a pair of guide projections being integrally formed by a flanged edge of the lid.

Still another embodiment of the barbeque grill assembly is illustrated in FIGS. 15–18. Referring to those figure, the guide projections 72 are preferably formed as an integral portion of the flanged edge 34 of the lid 24. One of the guide projections 72 is illustrated in FIGS. 15–16, the other guide projection 72 also being integrally formed by the flanged edge 34 of the lid 22.

Figure 17:
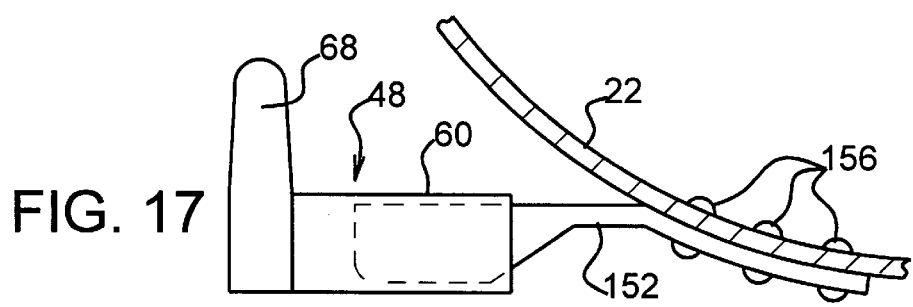
FIG. 17 is a fragmentary plan view of a corresponding portion of the bowl, with parts in section, to better illustrate one of the brackets mounted directly on the bowl.
Figure 18:
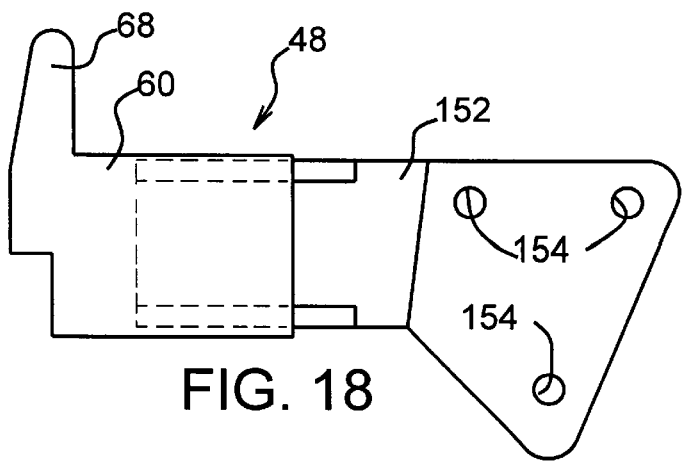
FIG. 18 is a side elevation view of a bracket adapted for direct attachment to the bowl taken from the bottom of FIG. 17.
Figure 19:
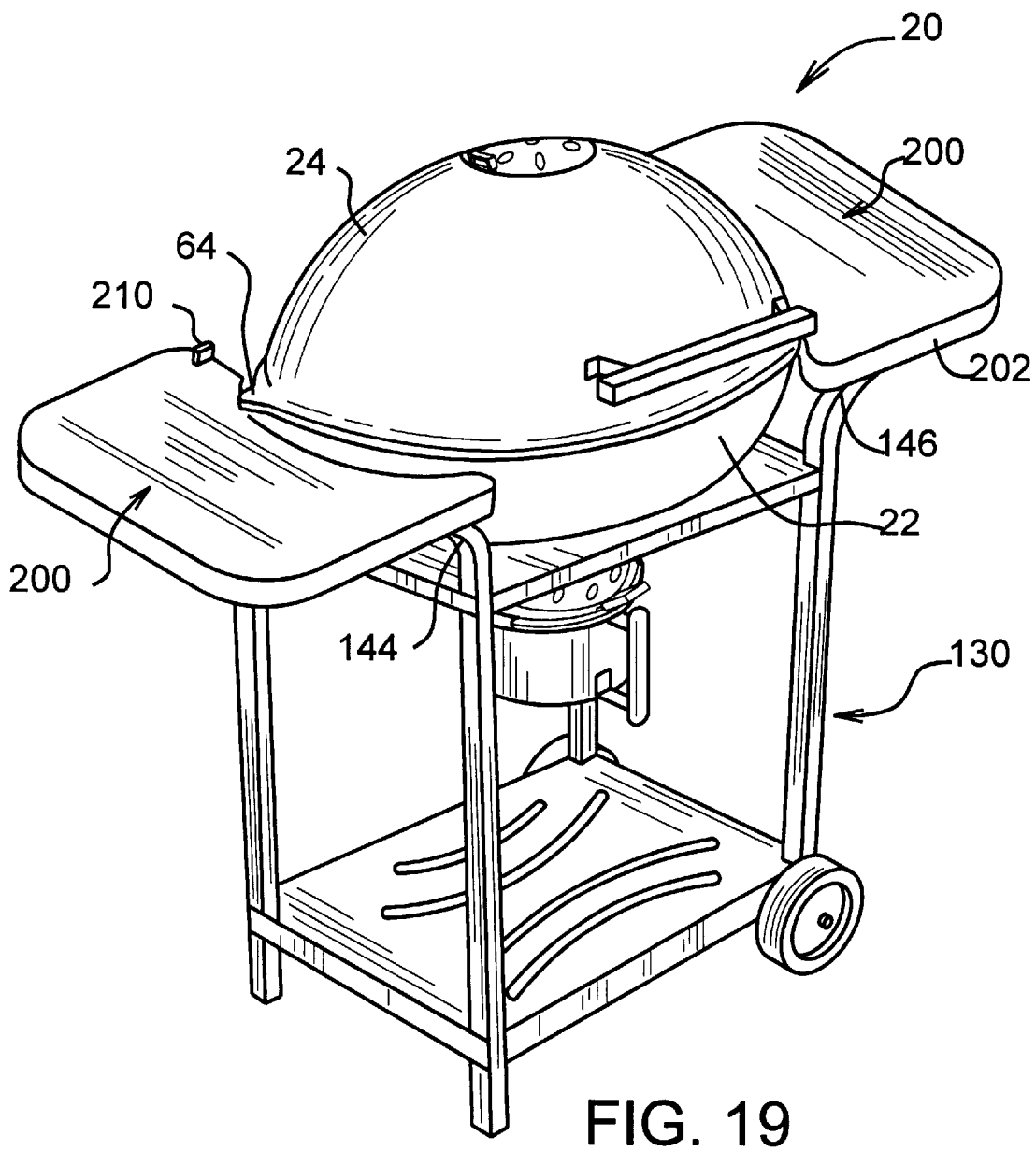
FIG. 19 is a front elevational view of the grill showing a pair of integral shelf lid holders.
Figure 20:
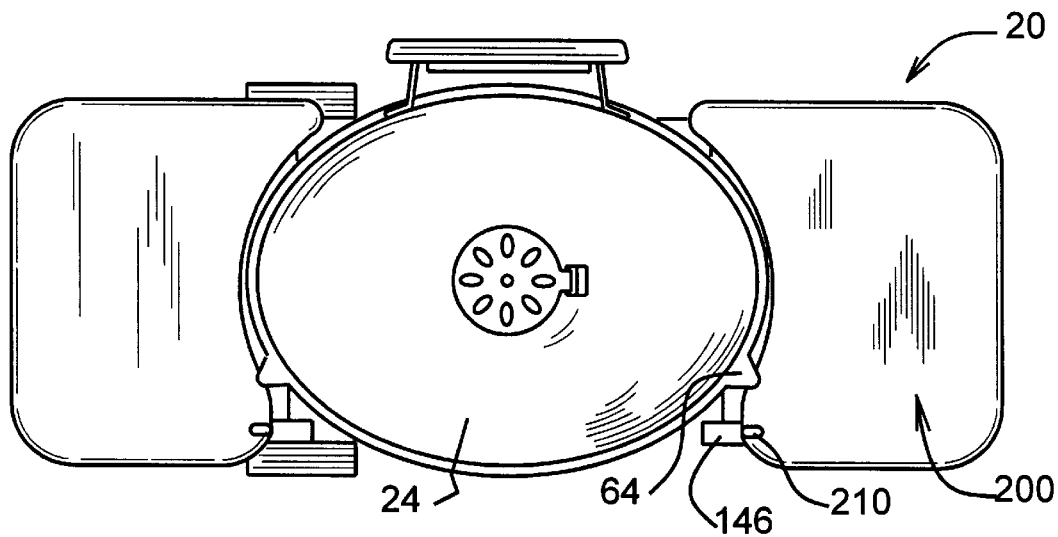
FIG. 20 is a top plan view of FIG. 19.
Figure 21:
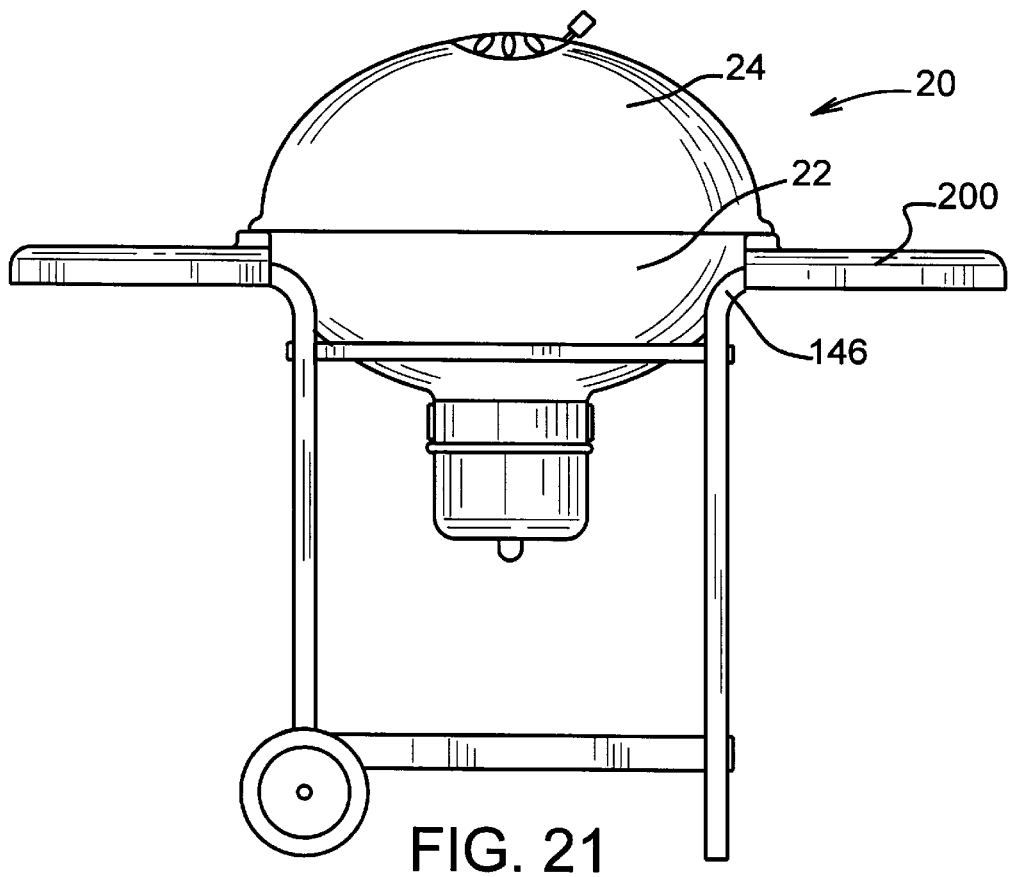
FIG. 21 is an elevational rear view of FIG. 19.
Figure 22:
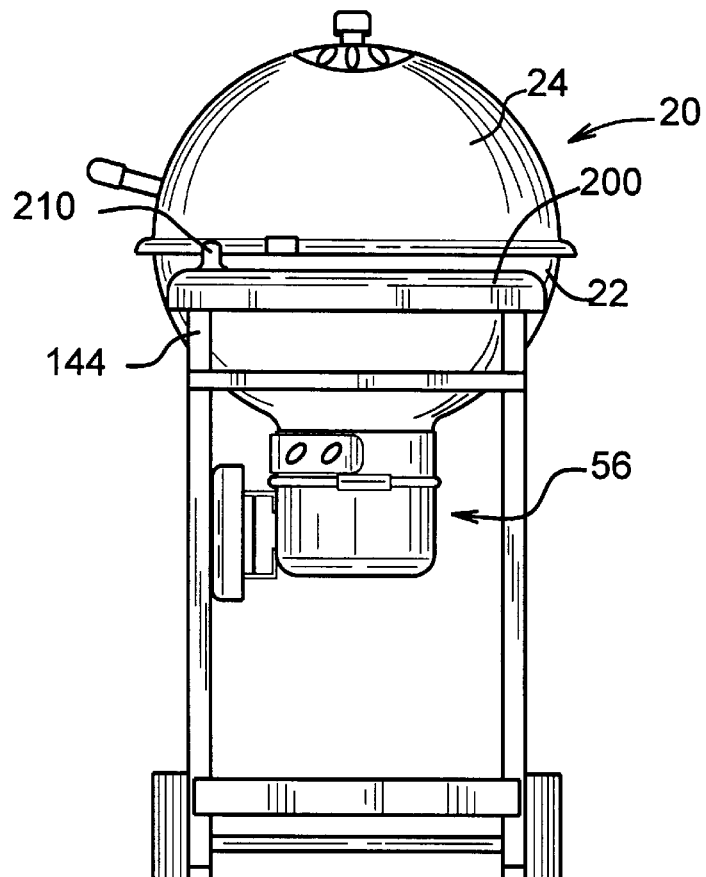
FIG. 22 is a left side view of FIG. 19, the right side view being a mirror image thereof.

Referring particularly to FIGS. 15, 17, and 18, the cradle brackets are preferably adapted for direct attachment to the bowl 22. One of the cradle brackets is indicated at 48. The bracket 48 is shaped substantially the same as the brackets 48 and 48 in FIGS. 1–13. However, the brackets 48 includes a metal shank 152 adapted for attachment to the bowl 22. Referring particularly to FIGS. 17 and 18, the metal shank 152 is formed with holes 154 so that the metal shank 152 and the bracket 48 may also be formed as an integral portion of the bowl 22 by conventional processes.

As shown in FIGS. 19–30, an integral shelf lid holder 200 is formed with a contemporary shape to fit closely to the bowl 22. Although the integral shelf lid holder 200 may be formed from metal, the preferred embodiment is comprised of a synthetic material, more particularly a thermoset polyester fiberglass reinforced plastic. The particular material is selected for the ease of moldability, weather ability, heat resistance, cleanability, light weight, and structural strength. The integral shelf lid holder 200 provides a means to mold a means for supporting the lid 24 into a solid shelf having a contoured contemporary shape at a reasonable cost.

Figure 23:
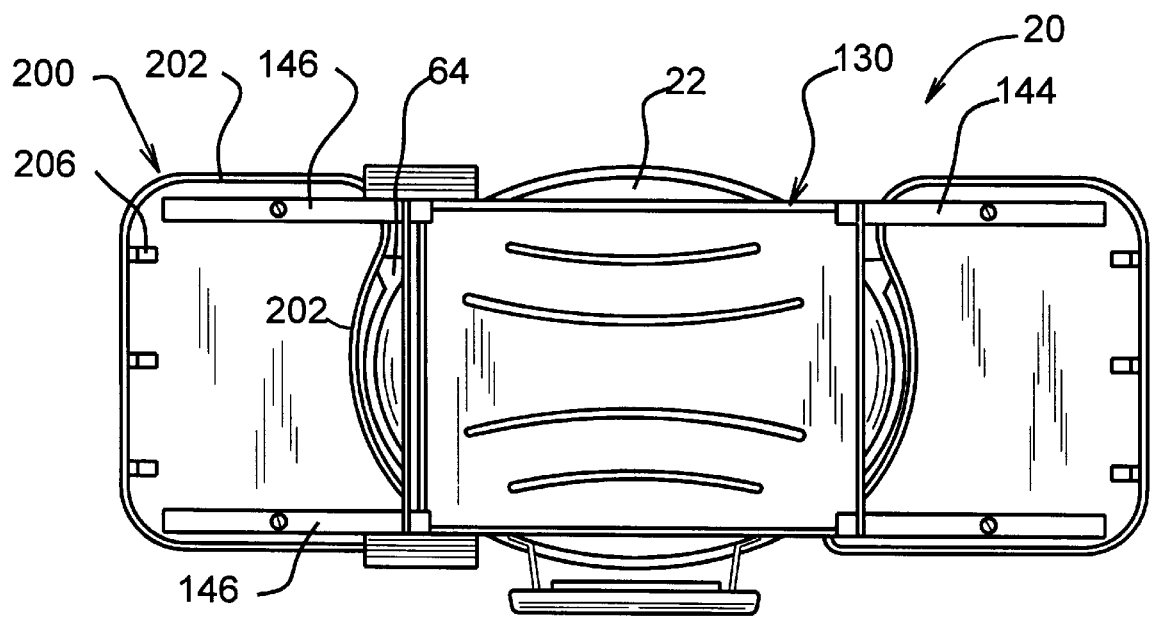
FIG. 23 is a bottom plan view of FIG. 19.
Figure 27:
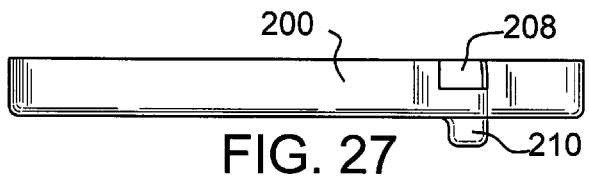
FIG. 27 is a rear elevational view of FIG. 24.
Figure 26:
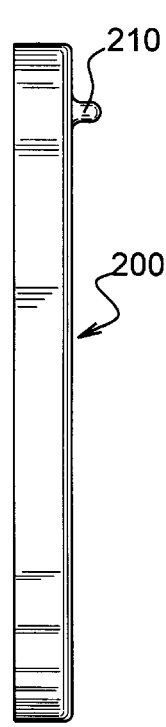
FIG. 26 is a left side elevational view of FIG. 24.
Figure 24:
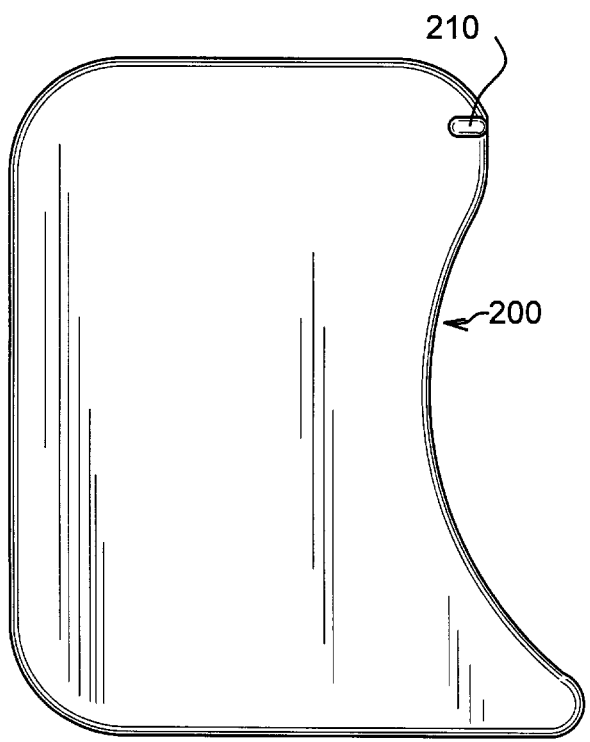
FIG. 24 is a top plan view of a left side shelf lid holder for a barbeque grill, the right side shelf lid holder being a mirror thereof.
Figure 25:
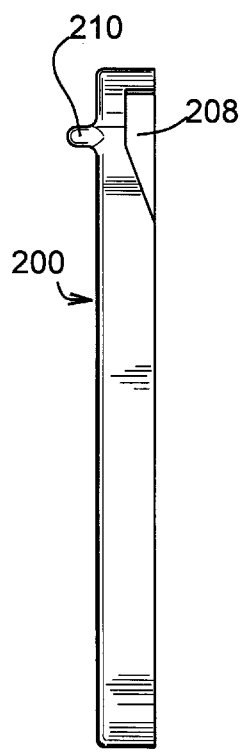
FIG. 25 is a right side elevational view of FIG. 24.
Figure 28:
FIG. 28 is a front elevational view of FIG. 24.
Figure 29:
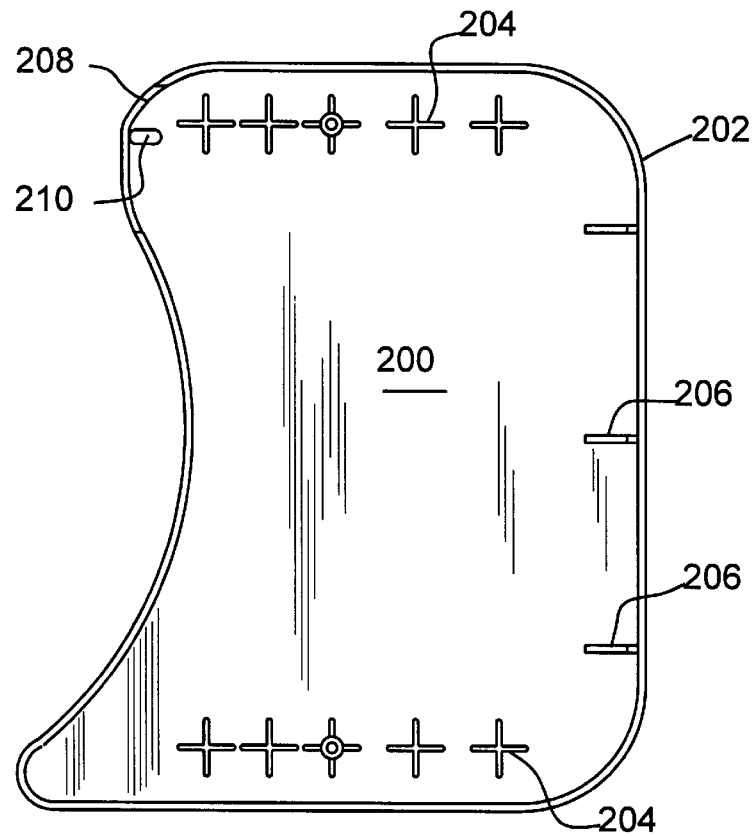
FIG. 29 is a bottom plan view of FIG. 24
Figure 30:
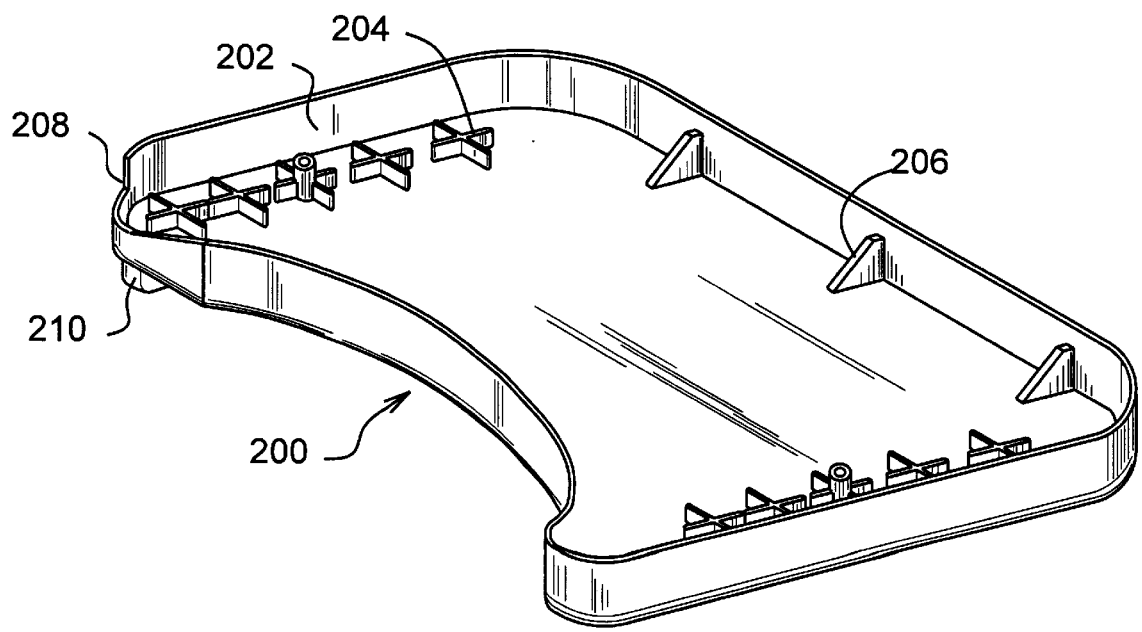
FIG. 30 is a bottom perspective view of FIG. 24.
Figure 31:
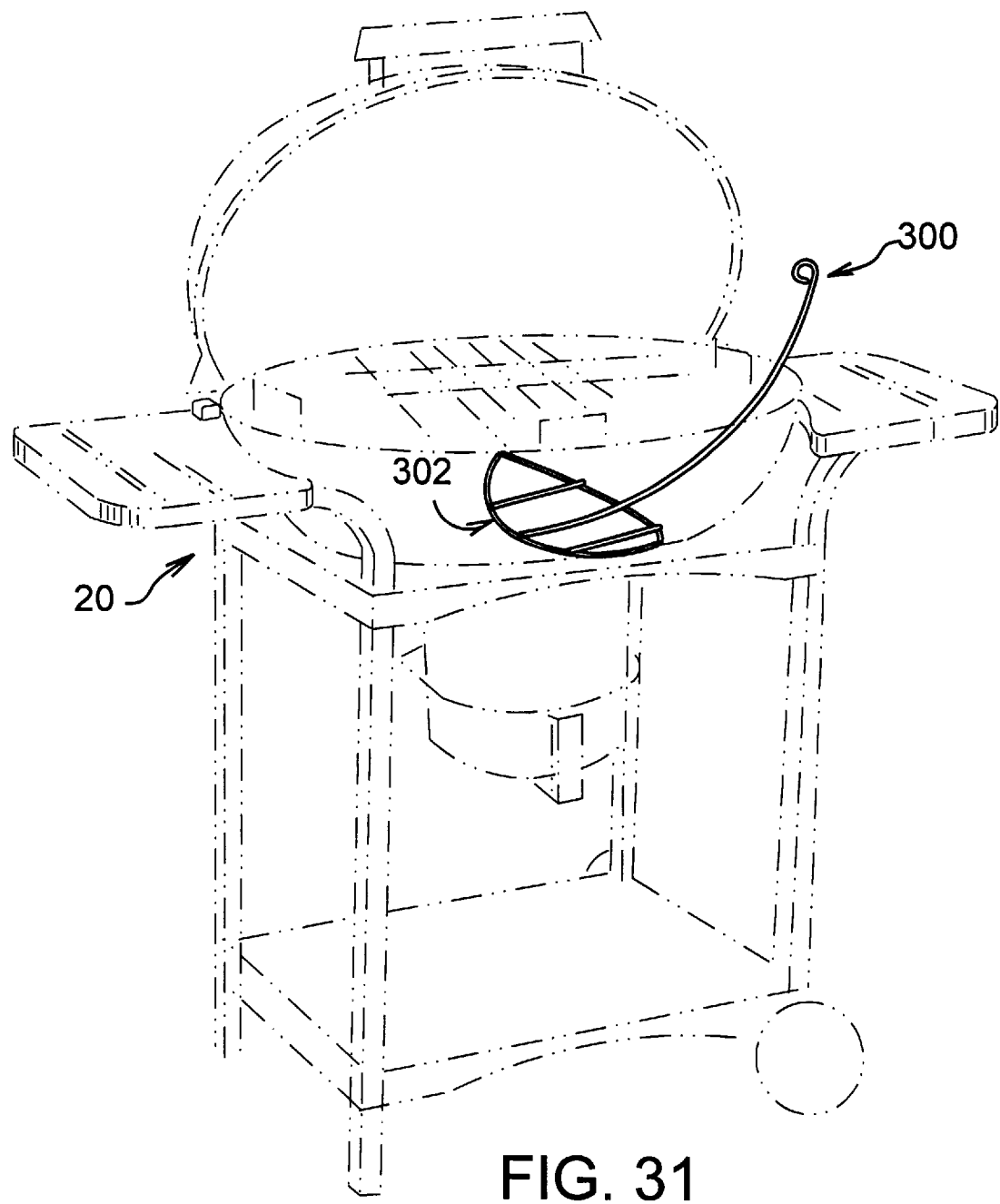
FIG. 31 is a front perspective view of the ash sweep assembly showing the position of the ash sweep in the grill bowl wherein the grill is shown in phantom lines.

As shown in FIGS. 29–30 and 23, the underside of the integral shelf lid holder 200 is substantially hollow having a rim or lip 202 extending around the periphery of the shelf 200. The integral shelf lid holder includes a plurality of spaced apart reinforcement projections 204 in the form of "X's" extending around the outer front and rear edges of the lip 202 on the underside of the integral shelf lid holder 200. The projections 204 are aligned to support the integral shelf lid holder 200 on the laterally extending portions 144 and 146 described previously. Moreover, at least one of the projections is formed having a hole therein alignable with holes formed in the laterally extending portions 144 and 146 for removably attaching the integral shelf lid holder 200 to the support structure 130 by fastening means such as screws. A plurality of triangular reinforcement members 206 are formed connecting the portion of the lip 202 extending along the outer exterior edge away from the grill bowl 22. The curvature of the lip 202 fitting around the bowl 22 provides additional structural support for supporting the lid 24. A small cutaway section or notch 208 allows the shelf to set on the laterally extending portions 144 and 146. A lid holder stop 210 is formed extending upwardly from the surface and near the inside rear portion of the integral shelf lid holder 200 for engaging the guide on the lid 24. The lid holder stop 210 is arranged or formed near the inner rear lip of the shelf to facilitate cradling of the lid 24 on the lid holder stops 210. It is also contemplated that a cradle bracket 64 may also be attached to the top surface of the shelf 200 as an alternative stop means to the preferred embodiment; however, the additional of an add on bracket detracts from the contemporary styling associated with an integral stop means. Guide projections 72 and 74 are mounted on the flanged edge of the lid 24 for engaging the lid holder stops 210 to insure that the lid 24 is in proper alignment.

Figure 36:
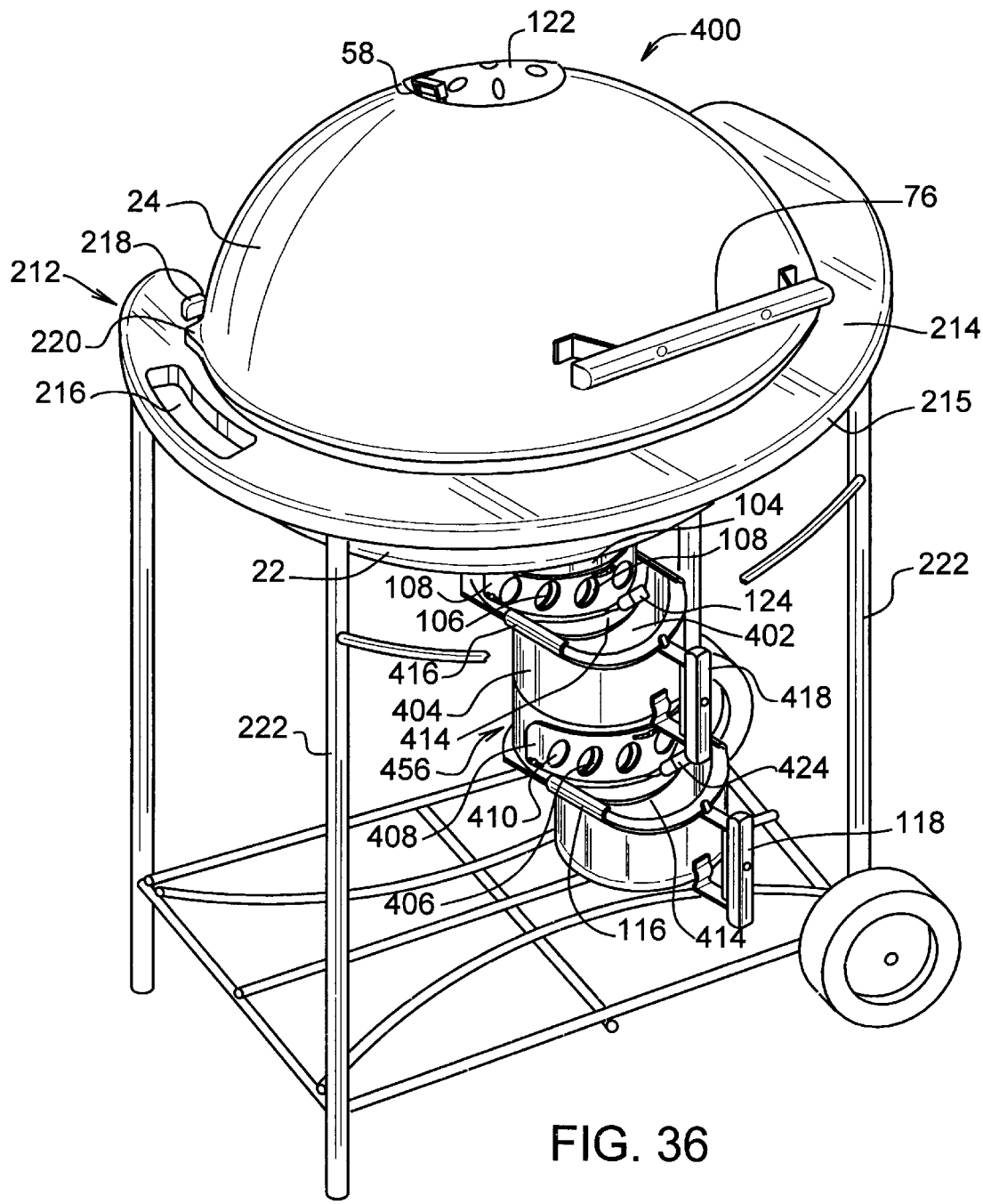
FIG. 36 is a front perspective view of a barbeque grill and smoker assembly showing the ash catcher in slidable relationship with the bottom of the smoker assembly.
Figure 41:
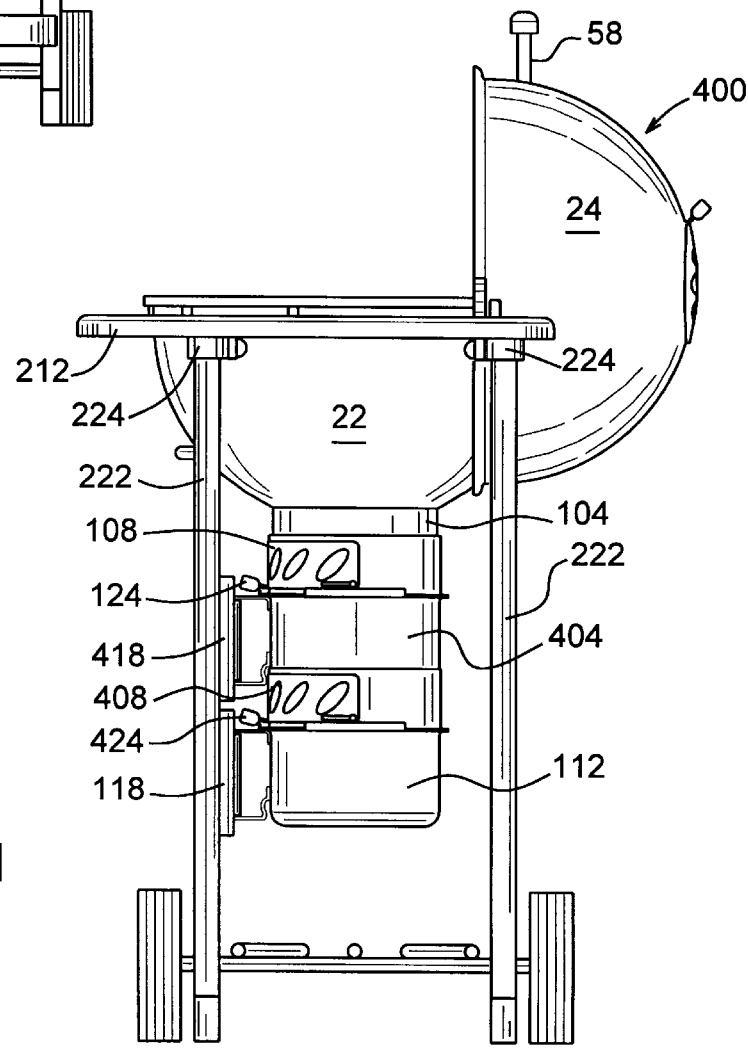
FIG. 41 is a side view showing the grill and smoker assembly.
Figure 43:
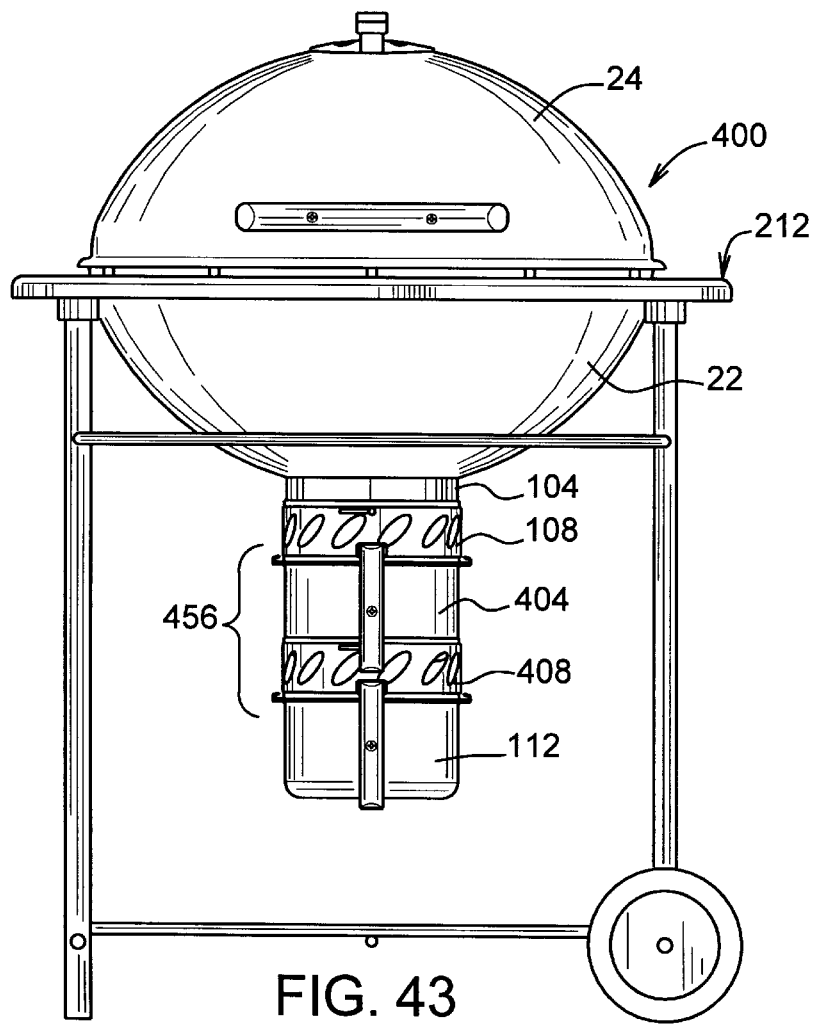
FIG. 43 is a front view showing the grill, smoker assembly, and ash catcher.

As shown in FIG. 36, an alternate type of integral shelf may be formed as continuous ring, (not shown), or preferably a partial ring shelf 212. As shown in the preferred embodiment, the partial ring shelf 212 is integrally formed defining a narrow ledge 214 extending around the front and sides of the bowl 22. The ledge 214 may be formed having a smooth top and bottom surface or having a smooth top surface and a bottom surface having reinforcing webbing (not shown). The outer edge 215 may be smooth or have a rim extending slightly above the surface of the ledge 212 to assist in retaining objects from sliding off of the ledge 212. A pair of cutaway notches 216 may be formed on either one or both sides of the ring shelf 212 providing the user with a handy towing handle or accessory hanger. A pair of projections or protrusions extending upwardly from the surface and near the inside rear portion of the ring shelf 212 form lid holder stops 218 for cooperative engagement with the projecting guide 220 on the lid 24. The lid holder stop 210 is arranged or formed near the inner rear lip of the shelf to facilitate cradling of the lid 24 on the lid holder stops 210. As shown in FIGS. 41 and 43, one or more recesses or cavities may be formed in the underside of the ring shelf 212 for cooperative engagement with leg support members 222. Preferably the recesses include reinforcing collars 224 integrally formed within the ring shelf 212.

Conversion of the barbeque grill 20 to a smoker 400 is an easy an relatively simple procedure.

Figure 37:
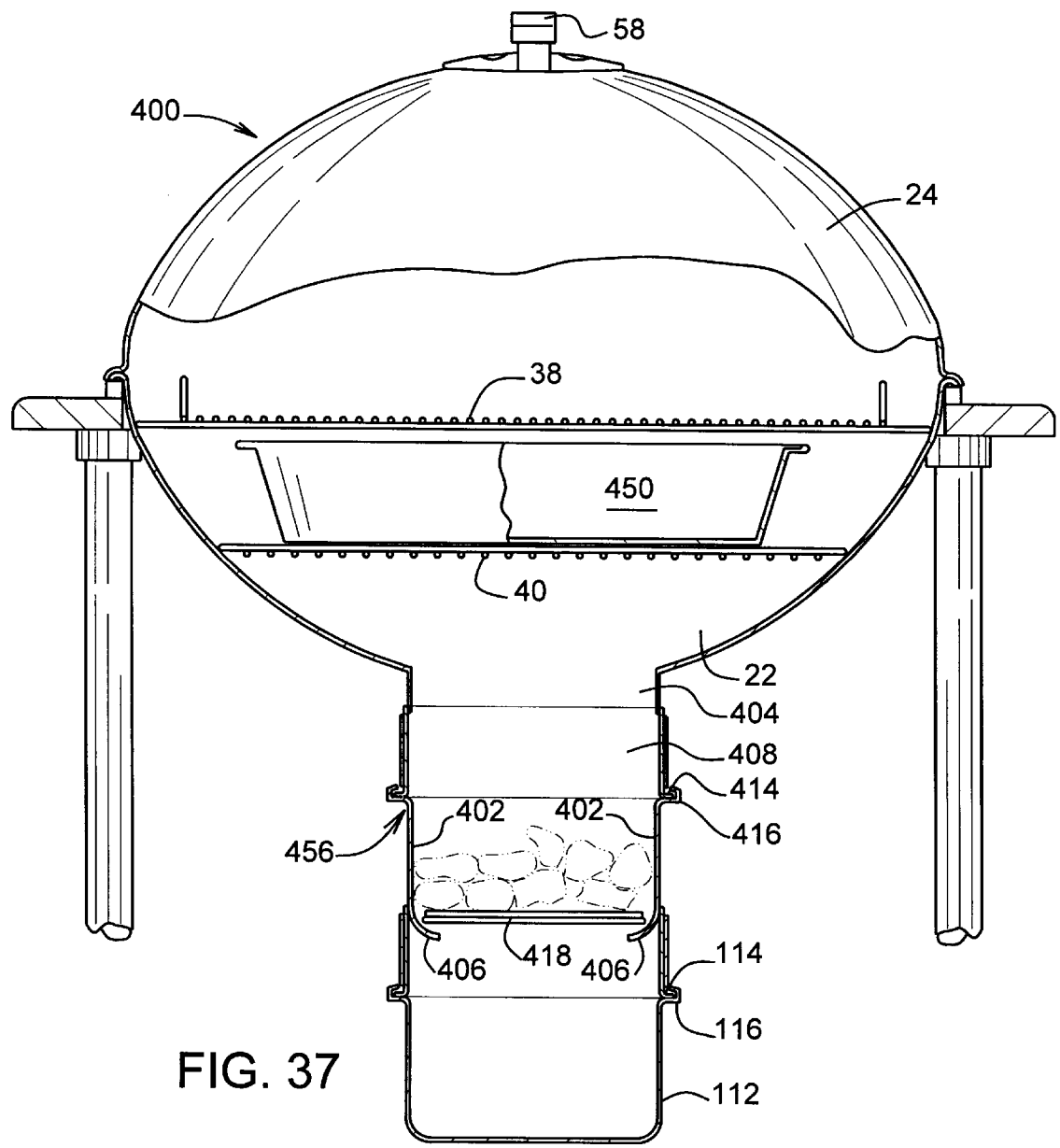
FIG. 37 is a cutaway front view of the barbeque grill and smoker assembly of FIG. 36 showing the charcoal briquets in phantom lines support on a wire grate resting on flanges formed within the smoker assembly positioned above the damper and an ash catcher slidably attached to the bottom of the smoker assembly.
Figure 38:
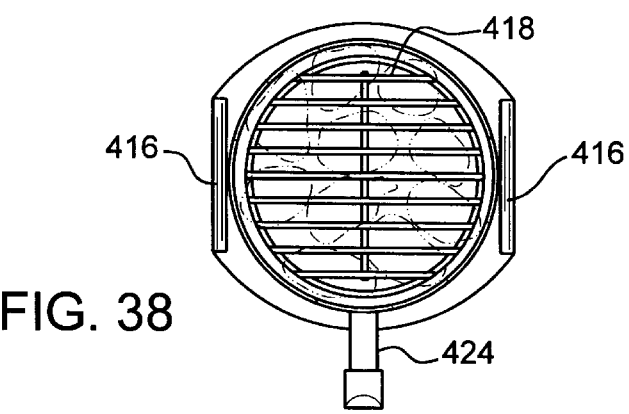
FIG. 38 is a top view of the smoker assembly showing the briquets in phantom lines resting on a wire grate therein.
Figure 39:
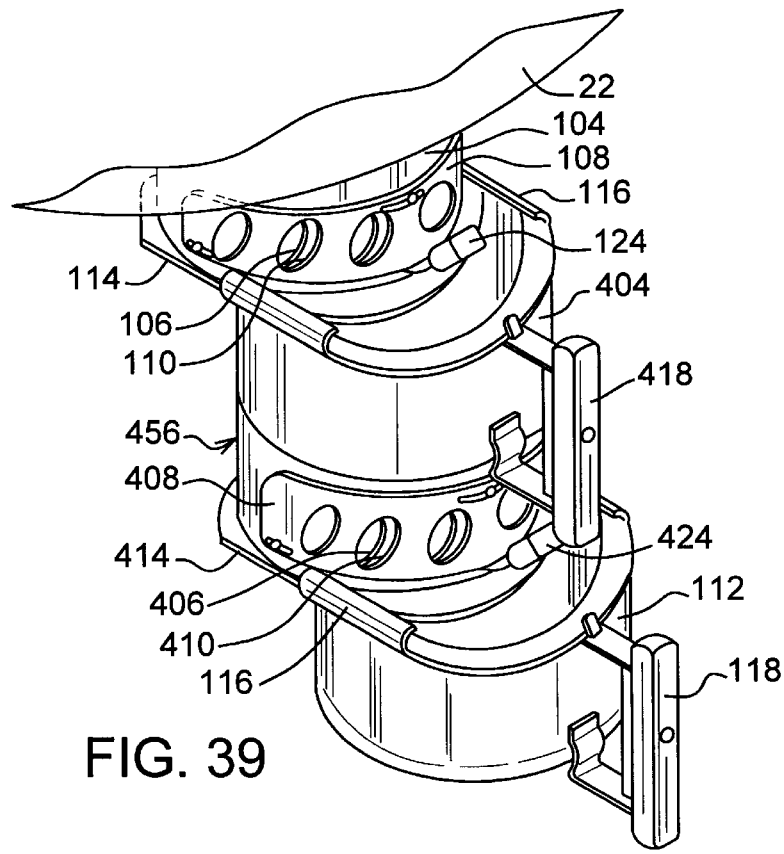
FIG. 39 is a perspective view of the grill and smoker showing the bottom section of the grill including an damper air flow means, the slidable smoker assembly including a damper air flow means, and the slider ash catcher cooperatively engaging the bottom portion of the smoker.

The smoker assembly 456 is substantially "mug" shaped and similar in appearance to the ash collector 112. The smoker assembly 456 includes a vertically extending tubular or cylindrical main body portion 404 formed having an open top and bottom with smoker vent perforations 406 at selected positions near the bottom of the main body 404. Preferably, the vent perforations 406 are inclined ellipses conforming to the overall configuration of the bowl 22 and lid 24 in combination. A collar 408 is movably mounted on the cylindrical body portion 404 and includes similar vent perforations 410. Thus the collar 408 provides a damper which may be moved or rotated in order to adjust the opening of the smoker vent assembly 456 or to move the perforation 406 and 410 out of register with each other to entirely close the vent assembly 456. For example, a tab 424 can be used to laterally adjust the collar 408 by rotation with respect to the tubular main body portion 404 for opening and closing the vent assembly 456. As shown best in FIG. 37, the bottom of the smoker body 404 includes an aperture or hole, wherein the side walls 402 are curved inwardly forming a flange 406. A support means 418 such as a wire grate, screen, or plate having openings is supported upon the flange 406 to support fuel such as wood chunks, wood chips, or charcoal upon smoker flange 406. It is contemplated that tabs, stringers or other such support means known in the art can be used to support the support means 418 in place of the flange 406. The support means 418 can be formed integrally as a bottom portion of the main body 404; however, forming the units separately facilitates cleaning of the smoker assembly 456. The top of the smoker body 404 includes flanges 416 designed for cooperative slidable engagement with the flanges 114 of the bowl vent assembly 56. Moreover, the bottom of the smoker body 404 includes flanges 416 designed for cooperative slidable engagement with the flanges 116 extending from the top of the ash collector 112. A handle 418 extends from one side of the smoker body 404.

An ash collector 112 is mounted beneath the vertically extending tubular main body portion of the smoker 404 in cooperative engagement with the self-cleaning flanges 114 of the bottom of the smoker body 404 and the flanges 116 extending from the top upper edge of the ash collector 112. The ash collector 112 also has a handle 118 to facilitate retraction of the collector 112 in order to empty ashes therefrom.

This smoker assembly 456 and ash collector 112 is particularly advantageous in that the bowl vent assembly 56 and lid vent 122 may all be used to regular the air flow to the fire to control the temperature and rate of air flow within various areas of the smoker 400 providing optimal control over the desired temperature at which the food is being smoked and potentially providing some control over the residence time in which the food is exposed to heat with respect to the moisture content of the air.

Moreover, aromatic flavoring herbs or woods may be placed directly on or near the smoker assembly to produce a smoke having particular flavor characteristics. A wood or charcoal fire is built inside the smoker assembly and the damper on the smoker assembly 456, bowl vent 56, and/or top vent 122 is adjusted to draw the heat and smoke from the smoker assembly 456 through the grill cooking chamber. The food to be smoked is placed on the top grill 38 inside the grill bowl 22 so that the food adsorbs the indirect heat and smoke from the smoker assembly 456. The cooking temperature can be adjusted up or down by adjusting the air vent and the bowl vent 56 and/or smoker assembly 456 dampers 408 to increase or reduce the air flow through the smoker assembly 456. A moist cooking environment may be produced by placing a water pan 450 inside the smoker 400 on the lower shelf 40, (the charcoal holding shelf when grilling), whereby the heated air vaporized the water and provides a means of increasing the humidity or moisture in the air and the dryness of the food article to be smoked therein. A flavored marinade may be utilized with the water to produce a organoleptic and flavor enhancing steam vapor as the liquid heats. The marinade vapor combines with the smoke to moisten and flavor the food. Thus, the aromatic smoke and steam vapors baste the food while the indirect heat slowly cooks the food. Furthermore, the pan 450 used in the present invention is an inexpensive aluminum foil pan which may be used several times until it becomes stained and soiled, then it can be discarded as recyclable aluminum material.

Figure 40:
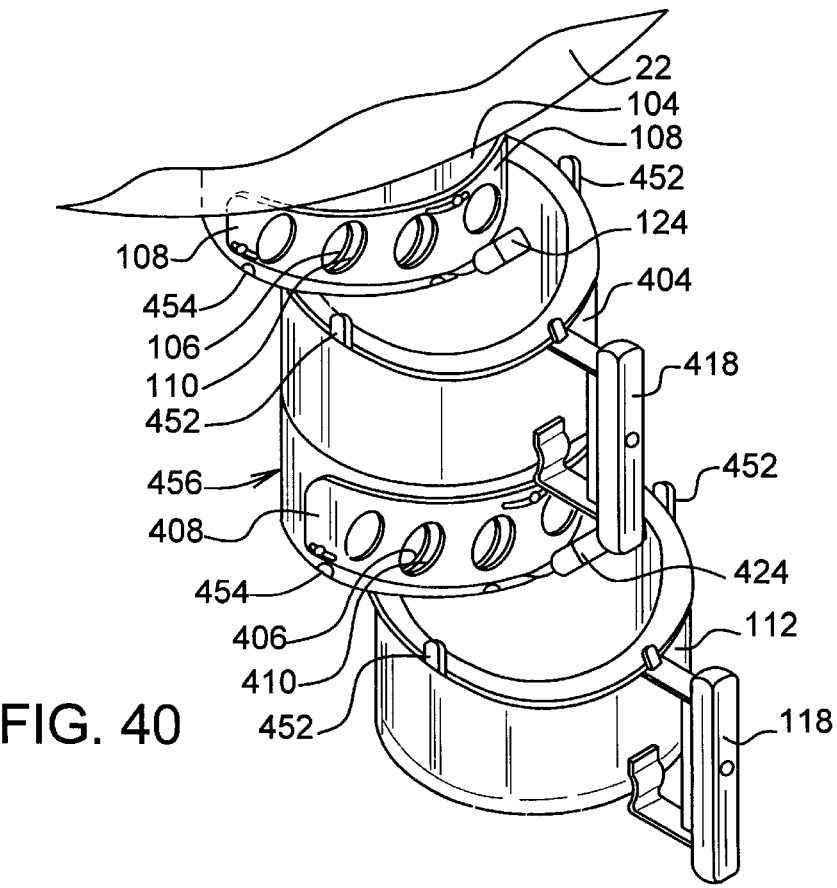
FIG. 40 is a perspective view of an alternate grill and smoker showing the smoker cooperatively engaging the grill and ash catcher by a plurality of tabs.
Figure 44:
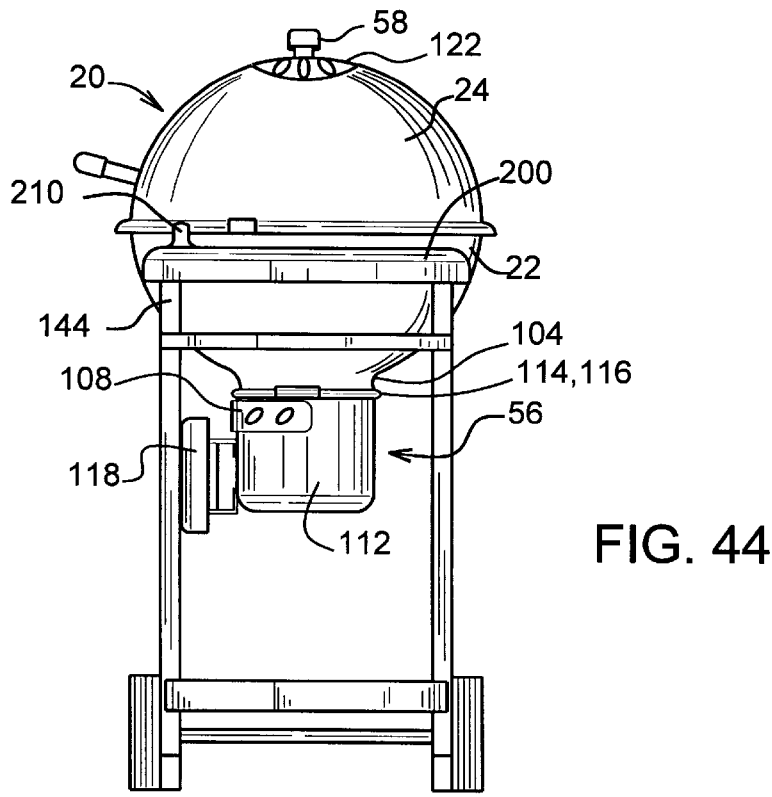
FIG. 44 is a side view of a grill showing an ash catcher having an extended top portion including a vent assembly attached to a bowl sleeve.

As shown in FIG. 40, it is contemplated that holding means such as a band (not shown) or tabs 452 in cooperative engagement with tab slots 454 may be used to connect the smoker assembly 456 to the vent bowl 104, and/or the ash collector 112 can be held in cooperative engagement with the vent bowl 104 or smoker assembly 456 by holding means such as tabs 452 in cooperative engagement with tab slots 454; or that the cylindrical surfaces of the vent bowl 104, smoker body 404, and/or ash collector 112 could be held in cooperative engagement by thread means or even clamp means. These alternate holding means work; however, the preferred embodiment utilizes self cleaning flange means 114, 116 in order to facilitate quick conversion from a grill to a smoker and vice versa.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A barbeque grill smoker, comprising:

a bowl having an opening therethrough and a sleeve extending downwardly therefrom;

a domed, free-standing lid mating with said bowl;

a smoker defining cylindrical sidewalls and including a means for holding fuel therein at a selected position, at least one vent aperture through said sidewalls at a selected position, and means for adjustably opening and closing said at least one vent aperture; and means for attaching said smoker to said sleeve of said bowl.

2. The barbeque grill smoker of claim 1, wherein said fuel is selected from the group consisting of wood and charcoal.

3. The barbeque grill smoker of claim 1, including an ash collector, said ash collector including cooperative means of attachment to said sleeve and/or said smoker.

4. The barbeque grill smoker of claim 3, wherein said ash collector extends from said smoker.

5. The barbeque grill smoker of claim 3, wherein said smoker is removably insertable between said sleeve and said ash collector.

6. The barbeque grill smoker of claim 3, wherein said ash collector includes a handle extending therefrom.

7. The barbeque grill smoker of claim 1, wherein said sleeve extending downwardly therefrom includes at least one flow vent perforation at a selected position.

8. The barbeque grill smoker of claim 7, including means for adjustably opening and closing said at least one vent aperture of said sleeve.

9. The barbeque grill smoker of claim 8, wherein said means for adjustably opening and closing said at least one vent aperture of said sleeve defines a collar rotatively mounted around said sleeve, said collar including at least one air flow vent perforation for slidable alignment with said at least one vent aperture of said sleeve providing means for opening, closing, and varying the size of the opening through said at least one vent aperture.

10. The barbeque grill smoker of claim 9, wherein said collar includes a tab for laterally adjusting said collar by rotation with respect to said sleeve.

11. The barbeque grill smoker of claim 1, wherein said means for adjustably opening and closing said at least one vent aperture of said smoker is a collar rotatively mounted around said smoker, said collar including at least one air flow vent perforation for slidable alignment with said at least one vent aperture of said sleeve providing means for opening, closing, and varying the size of the opening through said at least one vent aperture.

12. The barbeque grill smoker of claim 11, wherein said collar includes a tab for laterally adjusting said collar by rotation with respect to the smoker.

13. The barbeque grill smoker of claim 1, said smoker including a bottom portion having a hole therethrough and side walls forming a flange for cooperative engagement with means for supporting said fuel.

14. The barbeque grill smoker of claim 13, said means for supporting said fuel comprising a grate.

15. The barbeque grill smoker of claim 3, wherein a bottom portion of said smoker includes means for attachment designed for cooperative slidable engagement with an attachment means extending from a top portion of said ash collector.

16. The barbeque grill smoker of claim 3, wherein said bowl of said grill includes a top shelf and a bottom shelf.

17. The barbeque grill smoker of claim 16, including means for containing water positioned upon said bottom shelf creating a moist cooking environment therein.

18. The barbeque grill smoker of claim 17, wherein said water includes a flavored marinade.

19. The barbeque grill smoker of claim 17, said means for containing water is a disposable aluminum pan.

20. The barbeque grill smoker of claim 3, wherein said ash catcher is interchangeable with said smoker.

* * * * *